(12) United States Patent
Ono et al.

(10) Patent No.: US 12,438,490 B2
(45) Date of Patent: Oct. 7, 2025

(54) MOTOR DRIVE SYSTEM

(71) Applicant: NABTESCO CORPORATION, Tokyo (JP)

(72) Inventors: Yasuo Ono, Tokyo (JP); Kazuhito Nakamura, Tokyo (JP); Michael Haider, Zurich (CH); Dominik Bortis, Zurich (CH); Miric Spasoje, Zurich (CH); Walter Johann Kolar, Zurich (CH)

(73) Assignee: NABTESCO CORPORATION, Tokyo (JP)

( * ) Notice: Subject to any disclaimer, the term of this patent is extended or adjusted under 35 U.S.C. 154(b) by 169 days.

(21) Appl. No.: 18/492,044

(22) Filed: Oct. 23, 2023

(65) Prior Publication Data

US 2024/0056014 A1 Feb. 15, 2024

Related U.S. Application Data

(63) Continuation of application No. PCT/JP2022/018502, filed on Apr. 22, 2022.

(30) Foreign Application Priority Data

Apr. 22, 2021 (JP) ................................. 2021-072501
Sep. 17, 2021 (JP) ................................. 2021-151794

(51) Int. Cl.
*H02M 1/12* (2006.01)
*H02K 11/00* (2016.01)
*H02P 27/06* (2006.01)

(52) U.S. Cl.
CPC .......... *H02P 27/06* (2013.01); *H02K 11/0094* (2013.01)

(58) Field of Classification Search
CPC .. H02P 27/06; H02P 6/10; H02P 21/22; H02P 21/05; H02K 11/0094
See application file for complete search history.

(56) References Cited

U.S. PATENT DOCUMENTS 9,732,991 B2 * 8/2017 An .......................... F25B 1/005
2005/0002210 A1 1/2005 Moon et al.
(Continued)

FOREIGN PATENT DOCUMENTS

JP 2015139341 A 7/2015
JP 2017158233 A 9/2017
(Continued)

OTHER PUBLICATIONS

International Preliminary Report on Patentability with English translation of Written Opinion for corresponding International Application No. PCT/JP2022/018502; mailed Oct. 24, 2023; 10 pages.
(Continued)

*Primary Examiner* — Muhammad S Islam
(74) *Attorney, Agent, or Firm* — CANTOR COLBURN LLP

(57) ABSTRACT

A motor drive system includes: a first inverter connected to one end of an open-end winding of a three-phase motor, an input voltage from a single-phase AC power source being rectified into a rectified voltage and input to the first inverter; a second inverter connected to another end of the open-end winding and including a DC link capacitor; and a control unit that controls the first inverter so that a first inverter output voltage supplied from the first inverter to the three-phase motor is in phase with a motor current flowing in the three-phase motor, controls the second inverter to supply reactive power to the three-phase motor by making a second inverter output voltage supplied from the second inverter to the three-phase motor orthogonal to the motor current in order to make an instantaneous power supplied from the DC
(Continued)

link capacitor to the three-phase motor zero, and also controls the second inverter so that a q-axis component of the second inverter output voltage orthogonal to a d-axis component, which is a magnetic flux direction of the three-phase motor, pulsates in synchronization with the single-phase AC power source.

5 Claims, 23 Drawing Sheets

(56) References Cited

U.S. PATENT DOCUMENTS

| | | | |
|---|---|---|---|
| 2006/0164028 | A1 | 7/2006 | Welchko et al. |
| 2012/0032622 | A1 | 2/2012 | Lipo |
| 2021/0408893 | A1* | 12/2021 | Edlabadkar ............ H02M 7/48 |
| 2023/0170830 | A1* | 6/2023 | Lee ..................... H02P 21/22 318/811 |

FOREIGN PATENT DOCUMENTS

| | | |
|---|---|---|
| JP | 2018102070 A | 6/2018 |
| WO | 2019159665 A1 | 8/2019 |

OTHER PUBLICATIONS

International Search Report for corresponding International Application No. PCT/JP2022/018502; mailed Jun. 21, 2022; 5 pages.

Ohto, Y. et al. "Spatial Vector Modulation of Dual Inverters for Driving Open-End Winding PM Motors" IEE Japan 2017 (English abstract).

EPO Extended European Search Report for EP Application No. 22791802.6; Issued Mar. 6, 2025.

Nishio et al., "Electrolytic Capacitor-Less Dual Inverter-Fed IPMSM for Constant Torque and High Power Factor.", IEEE 2019, Nagaoka University of Technology, 6 pages.

Nishio et al., "Single-Phase to Three-Phase Electrolytic Capacitor-Less Dual Inverter-Fed IPMSM for Suppress Torque Pulsation", IEEE Transactions on Industrial Electronics, vol. 68, No. 8, Aug. 2021; 10 pages.

Sun et al., "Control of an Open-End Winding Electric Drive Fed by a Dual-Inverter Configuration with Common Mode Connected DC Buses", 2019, IEEE, 22nd International Conference on Electrical Machines and Systems (ICEMS); 6 pages.

* cited by examiner

MOTOR DRIVE SYSTEM

CROSS REFERENCES TO RELATED APPLICATIONS

This application is a continuation under 35 U.S.C. § 120 of PCT/JP2022/018502, filed Apr. 22, 2022, which is incorporated herein by reference, and which claimed priority to Japanese Application No. 2021-072501, filed Apr. 22, 2021, and Japanese Application No. 2021-151794, filed Sep. 17, 2021. The present application likewise claims priority under 35 U.S.C. § 119 to Japanese Application No. 2021-072501, filed Apr. 22, 2021, and Japanese Application No. 2021-151794, filed Sep. 17, 2021, the entire contents of which is also incorporated herein by reference.

BACKGROUND OF THE INVENTION

1. Field of the Invention

The present invention relates to motor drive systems.

2. Description of the Related Art

A dual inverter type motor drive device for driving an open-ended winding motor is disclosed (see, for example, non-patent literature 1).
[Non-patent literature 1] Motoki Nishio, Hitoshi Haga, "Spatial Vector Modulation of Dual Inverters for Driving Open-End Winding PM Motors", IEE Japan 2017 (161-174.176-179), 23-28, 2017-12-07, The Institute of Electrical Engineers of Japan

SUMMARY OF THE INVENTION

Conventionally, a large-capacitance electrolytic capacitor is used in dual inverter type open-end winding motor drive devices including a first inverter and a second inverter to compensate for pulsation of power supplied from the second inverter side (see, for example, non-patent literature 1). However, an electrolytic capacitor has a large volume and a short life and so is disadvantageous in terms of size, cost, and life. Therefore, a dual inverter type open-end winding motor drive system that does not require an electrolytic capacitor in the second inverter is called for.

A motor drive system according to an aspect of the present invention includes: a first inverter connected to one end of an open-end winding of a three-phase motor, an input voltage from a single-phase AC power source being rectified into a rectified voltage and input to the first inverter; a second inverter connected to another end of the open-end winding and including a DC link capacitor; and a control unit that controls the first inverter so that a first inverter output voltage supplied from the first inverter to the three-phase motor is in phase with a motor current flowing in the three-phase motor, controls the second inverter to supply reactive power to the three-phase motor by making a second inverter output voltage supplied from the second inverter to the three-phase motor orthogonal to the motor current in order to make an instantaneous power supplied from the DC link capacitor to the three-phase motor zero, and also controls the second inverter so that a q-axis component of the second inverter output voltage orthogonal to a d-axis component, which is a magnetic flux direction of the three-phase motor, pulsates in synchronization with the single-phase AC power source.

Another aspect of the present invention also relates to a motor drive system. The motor drive system includes: a first inverter connected to one end of an open-end winding of a three-phase motor and including a pair of first DC link capacitors connected in series, an input voltage from a single-phase AC power source being rectified into a rectified voltage and input to the first inverter; and a second inverter connected to another end of the open-end winding and including a pair of second DC link capacitors connected in series. A midpoint of the pair of first DC link capacitors and a midpoint of the pair of second DC link capacitors are connected to each other. The motor drive system includes: a control unit that controls the first inverter and the second inverter so as to compensate for an active power of the second inverter by power transfer via a common-mode current flowing between the midpoint of the first DC link capacitor and the midpoint of the second DC link capacitor.

Optional combinations of the aforementioned constituting elements, and mutual substitution of constituting elements and implementations of the present invention between methods, apparatuses, programs, transitory or non-transitory recording mediums carrying the program, systems, etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
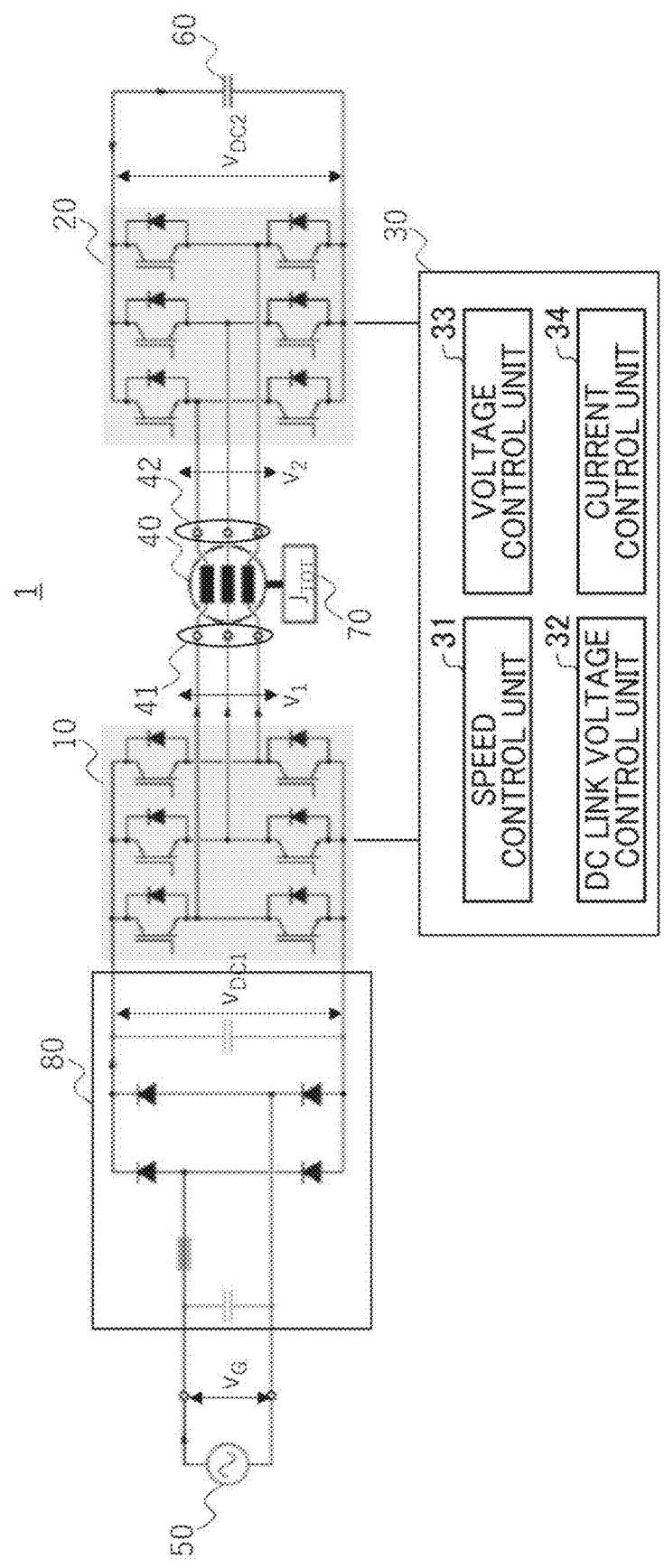
FIG. 1 is a block diagram illustrating the motor drive system according to the first embodiment.

The invention will now be described by reference to the preferred embodiments. This does not intend to limit the scope of the present invention, but to exemplify the invention.

This application claims priority right to Japanese Patent Application No. 2021-072501 and Japanese Patent Application No. 2021-151794. The contents of these basic applications are incorporated into this application by reference. In the following embodiment, like constituting elements are denoted by like reference numerals, and a duplicate description is omitted. For convenience of explanation, some of the constituting elements are omitted as appropriate in the drawings.

First Embodiment

FIG. 1 is a block diagram illustrating an example of a motor drive system 1 according to the first embodiment. The motor drive system 1 functions as a system for driving a three-phase motor 40 including an open-end winding based on an input voltage $v_G$ from a single-phase AC power source 50. As an example, the motor drive system 1 can be used to drive a variety of motors for pumps, compressors, electric actuators in ships and airplanes, robotic arms, etc. The motor drive system 1 includes a first inverter 10 connected to one end 41 of the open-end winding of a three-phase motor 40, an input voltage $v_G$ from a single-phase AC power source 50 being rectified by a rectifier unit 80 and input to the first inverter 10. The system also includes: a second inverter 20 connected to another end 42 of the open-end winding and including a DC link capacitor 60; and a control unit 30 that controls the first inverter 10 and the second inverter 20. As described later, the control unit 30 controls the first inverter 10 so that a first inverter output voltage $v_1$ supplied from the first inverter 10 to the three-phase motor 40 is in phase with a motor current flowing in the three-phase motor 40. The control unit also controls the second inverter 20 to supply reactive power to the three-phase motor by making a second inverter output voltage $v_2$ supplied from the second inverter 20 to the three-phase motor 40 orthogonal to the motor current in order to make the instantaneous power supplied from the DC link capacitor 60 to the three-phase motor 40 zero. Furthermore, the control unit 30 controls the second inverter 20 so that the q-axis component of the second inverter output voltage orthogonal to the d-axis, which is the magnetic flux direction of the three-phase motor 40, pulsates in synchronization with the single-phase AC power source 50. A load 70 is connected to the three-phase motor 40. In this specification, the upstream side along the flow of power or signal from the single-phase AC power source 50 toward the output of the three-phase power may be referred to as the front stage or the input, and the downstream side may be referred to as the back stage or the output.

The single-phase AC power source 50 may be, for example, a commercial power source or a generator. The single-phase AC power source 50 outputs an input voltage to the rectifier unit 80.

The rectifier unit 80 is, for example, a rectifier circuit having a PFC (Power Factor Correction) function and may be realized by using a known technology. The rectifier unit 80 generates a rectified voltage $v_{DC1}$ by subjecting the input voltage $v_G$ input from the single-phase AC power source 50 to full-wave rectification and removing high frequencies from the current waveform by using the PFC function. The rectifier unit 80 outputs the rectified voltage $v_{DC1}$ to the first inverter 10.

The first inverter 10 is disposed in the back stage of the rectifier unit 80 and generates the first inverter output voltage $v_1$, which is a three-phase AC voltage, based on the rectified voltage $v_{DC}$. The first inverter 10 may be realized by using a known technology. The three-phase AC voltage may consist of, for example, a U phase, a V phase, and a W phase, and may alternate with a phase difference of $2\pi/3$. The first inverter 10 supplies the generated first inverter output voltage $v_1$ to one end 41 of the open-end winding of the three-phase motor 40.

The second inverter 20 is disposed in the back stage of the three-phase motor 40 and generates the second inverter output voltage $v_2$, which is a three-phase AC voltage. The second inverter 20 may also be realized by using a known technology. The second inverter 20 supplies the generated second inverter output voltage $v_2$ to the other end 42 of the open-end winding of the three-phase motor 40.

The second inverter 20 has a DC link capacitor 60. The DC link capacitor 60 is comprised of a small-capacitance capacitor such as a film or ceramic capacitor. The DC link capacitor 60 functions as a means for removing switching noise, etc. Since the pulsation of the second inverter output voltage $v_2$ is eliminated by the control described later, the DC link capacitor 60 need not be a large-capacitance electrolytic capacitor. Hereinafter, the capacitor voltage applied to the ends of the DC link capacitor 60 will be denoted by $V_{DC2}$.

The control unit 30 includes a speed control unit 31, a DC link voltage control unit 32, a voltage control unit 33, and a current control unit 34. The control unit 30 controls the first inverter 10 so that the first inverter output voltage $v_1$ supplied from the first inverter 10 to the three-phase motor 40 is in phase with the motor current flowing in the three-phase motor 40. The control unit also controls the second inverter 20 to supply reactive power to the three-phase motor by making the second inverter output voltage $v_2$ supplied from the second inverter 20 to the three-phase motor 40 orthogonal to the motor current in order to make the instantaneous power supplied from the DC link capacitor 60 to the three-phase motor 40 zero. Furthermore, the control unit 30 controls the second inverter 20 so that the q-axis component of the second inverter output voltage orthogonal to the d-axis, which is the magnetic flux direction of the three-phase motor 40, pulsates in synchronization with the single-phase AC power source 50. Details of the control by the control unit 30 will be described later.

The three-phase motor 40 is driven by the first inverter output voltage $v_1$ supplied from the first inverter 10 and the second inverter output voltage $v_2$ supplied from the second inverter 20 and transmits the obtained power to the load 70 to move the load 70.

The load 70 is a load such as a flywheel moved by the three-phase motor 40 and has an inertia $J_{TOT}$ (for example, a moment of inertia).

The rectifier unit 80 may not necessarily have a PFC function. That is, the rectifier unit 80 may be replaced by any type of rectifier circuit that generates a DC voltage from an AC voltage.

[Related-Art Control Method]

Figure 2:
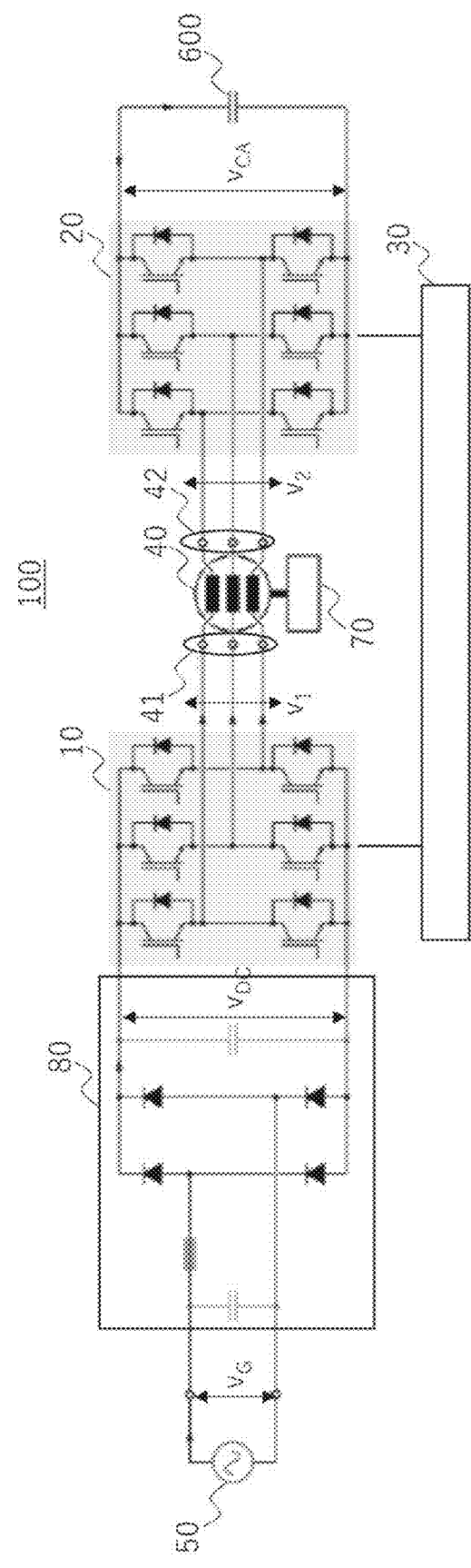
FIG. 2 is a block diagram showing a conventional dual inverter type motor drive device.

Before describing the control method of the motor drive system according to the embodiment, the conventional control method for a dual inverter type motor drive device will be described. FIG. 2 is a block diagram showing a conventional dual inverter type motor drive device 100. The motor drive device 100 differs from the motor drive system 1 of FIG. 1 in that the DC link capacitor 600 is comprised of a large-capacitance electrolytic capacitor. This electrolytic capacitor is for buffering and compensating for the second inverter output voltage $v_2$ supplied from the second inverter 20 of the motor drive device 100 to the three-phase motor 40.

As shown in FIG. 2, the motor drive device 100 is configured such that the single-phase AC power source 50 on the side of the first inverter 10 is replaced by a DC link capacitor 600 on the side of the second inverter 20. The input power supplied from the side of the second inverter 20 pulsates at a frequency twice the power supply frequency. In this case, as shown in the power balance expression (1), the input power $p_G(t)$ is the sum of the motor power $T_M(t)$ and the DC link capacitor power $p_{c2}(t)$.

$$p_G(t) = p_M(t) + p_{C2}(t) \quad (1)$$

Therefore, the pulsation of the input power $p_G(t)$ can be broken down into the motor and the DC link capacitor of the second inverter. In this case, the average power of the DC link capacitor of the second inverter becomes zero. Thus, in the motor drive device 100, the pulsation of the input power is compensated for by configuring the DC link capacitor with a large capacitance electrolytic capacitor. According to this control method, the motor obtains a constant power equal to the average input power (expression (2)).

$$p_M(t) = \bar{p}_M = p_0 \quad (2)$$

In this case, the capacitor must compensate for the power pulsating at an average power of 0 at a period twice the power supply frequency (expression (3)).

$$p_{C2}(t) = \tilde{p}_G(t) \quad (3)$$

Figure 3:
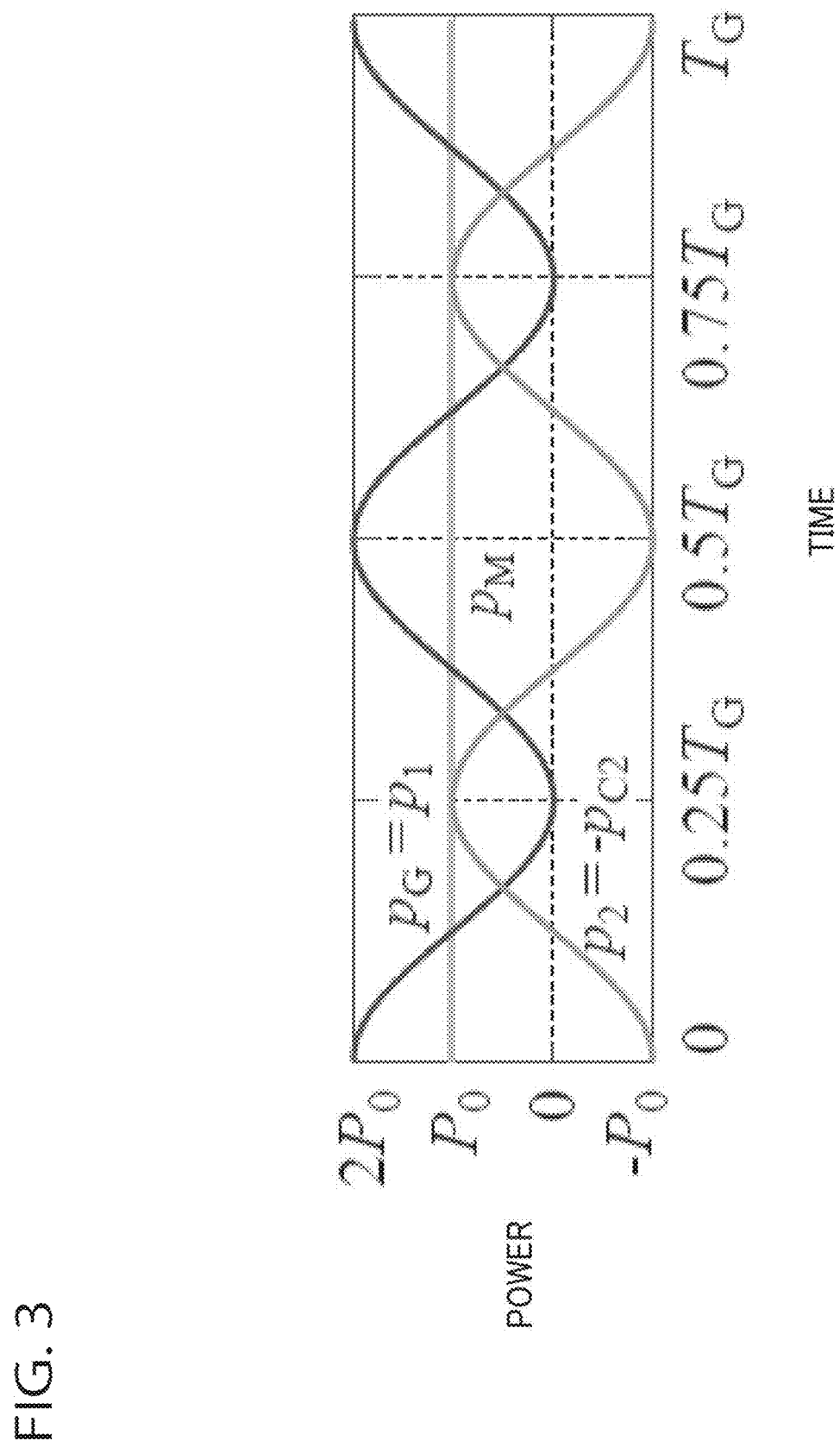
FIG. 3 shows the waveforms of the input power, the motor power, and the DC link capacitor power occurring when the conventional control is performed.

FIG. 3 shows the waveforms of the input power $p_G(t)$, the motor power $T_M(t)$, and the DC link capacitor power $p_{c2}(t)$ in this case.

In order to obtain a constant motor output and a constant motor induced voltage, the torque $t_M(t) = T_M$ and the q-axis current $i_{Mq}(t)$ of the motor current must also be constant. In addition, the q-axis current component and the magnitude of the motor current must be equal (expression (4)) to minimize the motor current.

$$i_M(t) = i_{Mq}(t) = \frac{2}{3} \frac{p_M}{V_P} \quad (4)$$

As a result, $i_M(t)$ is constant so that the d-axis voltage component can be zero ($v_{1d}(t) = 0$). As shown in expression (5), the first inverter needs to output the required power from the input to the motor (input power=first inverter output), and the output voltage $v_1(t)$ should pulsate sinusoidally at a period twice the power supply period (expression 6).

$$p_1(t) = \frac{3}{2} i_M(t) \cdot v_1(t) = p_G(t) \quad (5)$$

$$v_1(t) = v_{1q}(t) = \hat{V}_1 \cdot \cos^2(2\pi f_G t) \quad (6)$$

That is, since the current is constant, the voltage pulsates in accordance with the power pulsation. This peak voltage is calculated as given by expression (7) by the maximum modulation rate $M_{max}$ and the peak input voltage $\hat{V}_G$.

$$\hat{V}_1 = M_{max} \cdot \hat{V}_G / 2 \quad (7)$$

Figure 4:
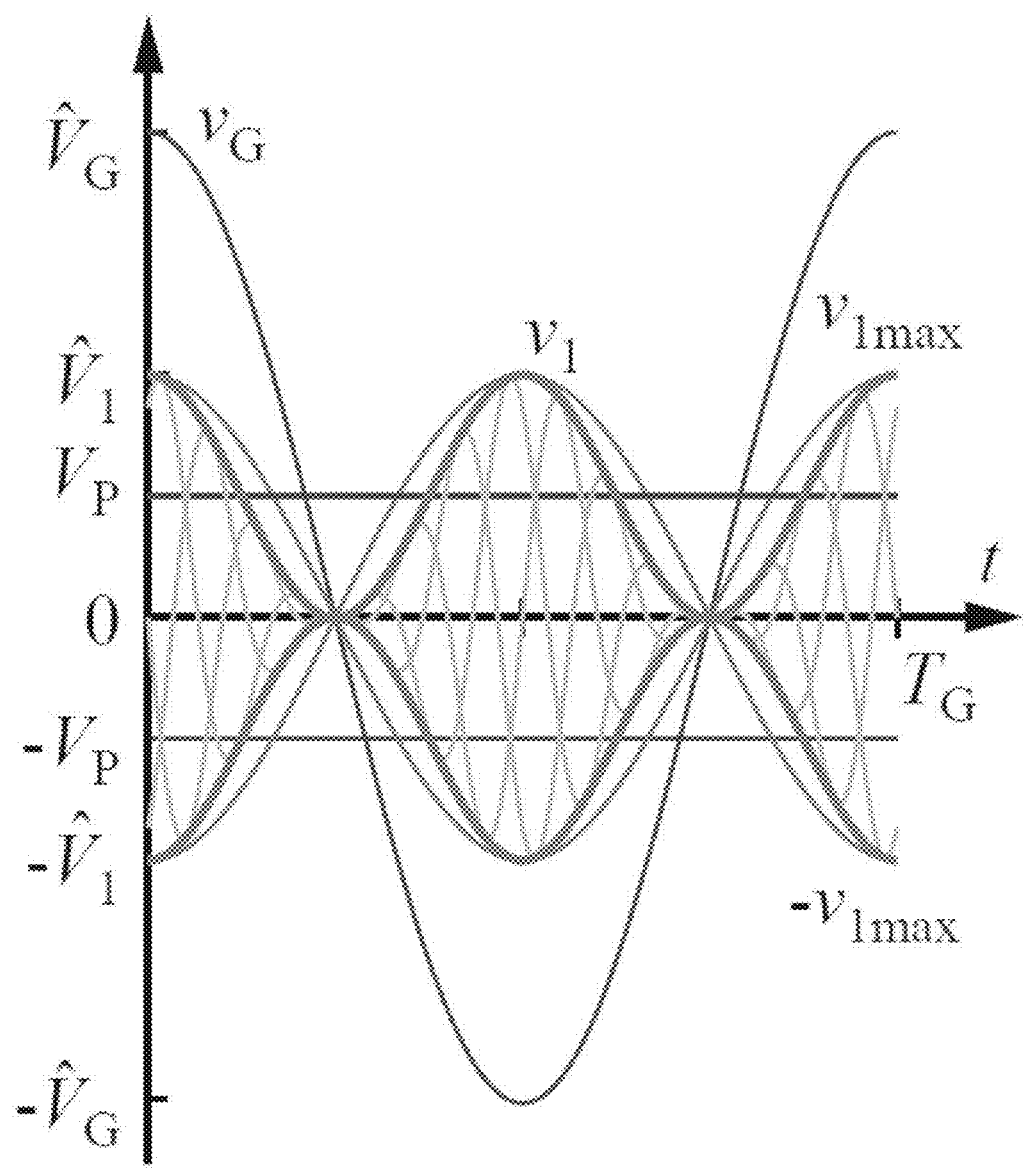
FIG. 4 shows the waveforms of the input voltage and the first inverter output voltage occurring when the conventional control is performed.

FIG. 4 shows the waveforms of the input voltage $v_G(t)$ and the first inverter output voltage $v_1(t)$ in this case.

The same reasoning similarly applies to the length of the space vectors corresponding to the first inverter output voltage $v_1$ and the second inverter output voltage $v_2$. Since the motor inductance is small (i.e., negligible), these space vectors are oriented in the same direction as the space vector $V_P$ of the motor voltage. Therefore, the sum of the inverter q-axis voltages must match the motor voltage (expression (8)).

$$v_{1q}(t) + v_{2q}(t) = v_M(t) = V_P \quad (8)$$

Figure 5:
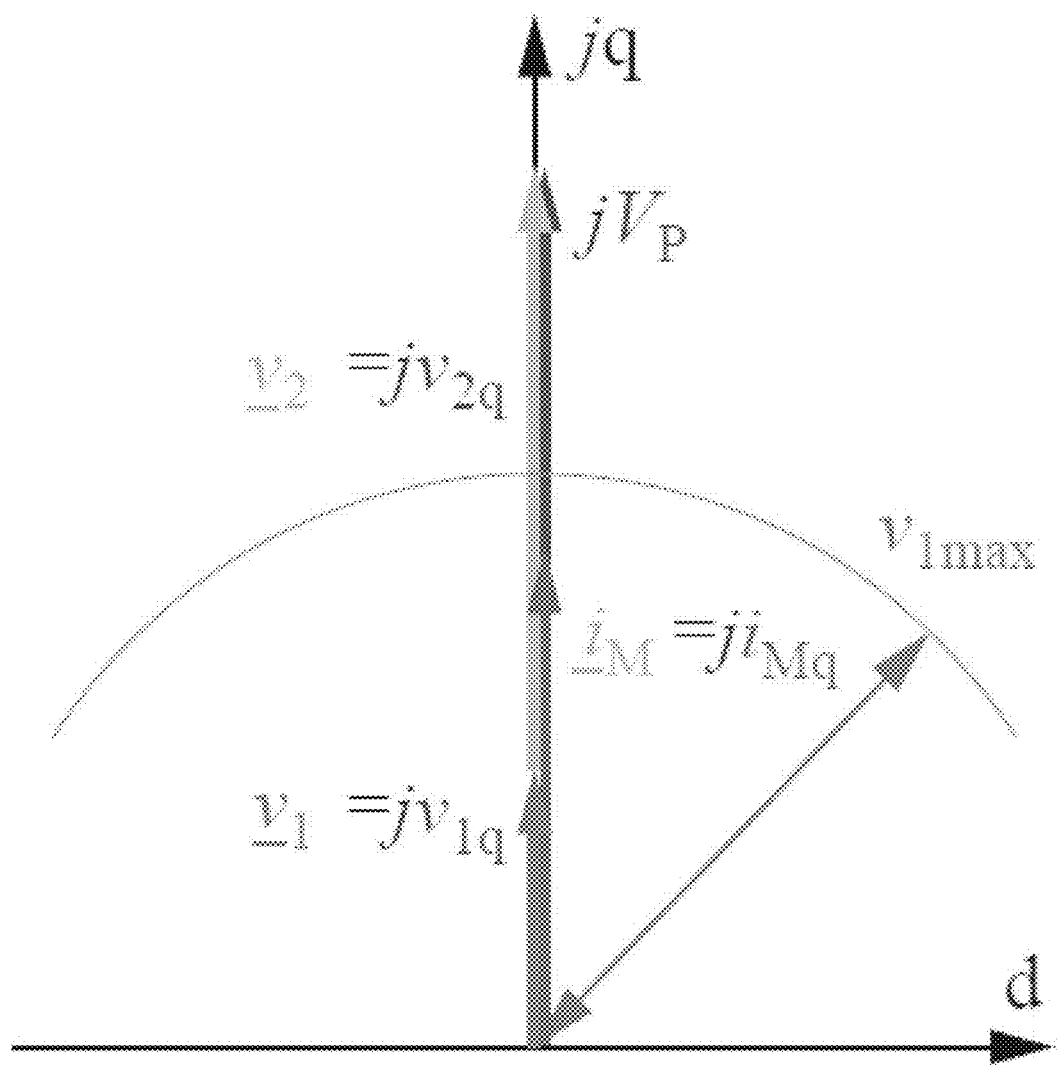
FIG. 5 shows space vectors corresponding to the first inverter output voltage and the second inverter output voltage occurring when the conventional control is performed.

FIG. 5 shows space vectors corresponding to the first inverter output voltage $v_1$ and the second inverter output voltage $v_2$ in this case.

The operating conditions of the motor drive device 100 are as follows.

When the first inverter output voltage $v_{1q}(t)$ is smaller than the motor voltage $v_P$:
  The second inverter adds the voltage $v_{2q}(t)$.
When the first inverter output voltage $v_{1q}(t)$ is larger than the motor voltage $v_P$:
  The second inverter subtracts the voltage $v_{2q}(t)$.

Thus, the average power $p_{c2}$ of the second capacitor operating to compensate for the pulsation of the input power becomes zero in one period. Further, since the motor voltage $V_P$ is $\hat{V}_1/2$, the maximum motor voltage $V_P = V_G/4$ (modulation rate $M_{max} = 1$).

In this case, it is necessary for the maximum output voltage of the second inverter to supply the maximum motor voltage $V_P$ at a point of time when the power supply voltage zero-crosses. Therefore, the input voltage range of the second inverter is $-V_P$ to $V_P$. In addition, the DC link voltage of the second inverter needs to be such that $v_{DC} > 2V_P$. In addition, since the input power pulsates with a zero-mean amplitude, it must be compensated for by the DC link capacitor of the second inverter. In order to compensate for this power pulsation, a large capacitance ($C_2$) capacitor (e.g., a large-capacitance electrolytic capacitor) is needed (expression (9)).

[Mathematical expression 9]

$$C_2 > \frac{2P_0}{2\pi f_G (v_{DC2,max}^2 - v_{DC2,min}^2)} \quad (9)$$

Figure 6:
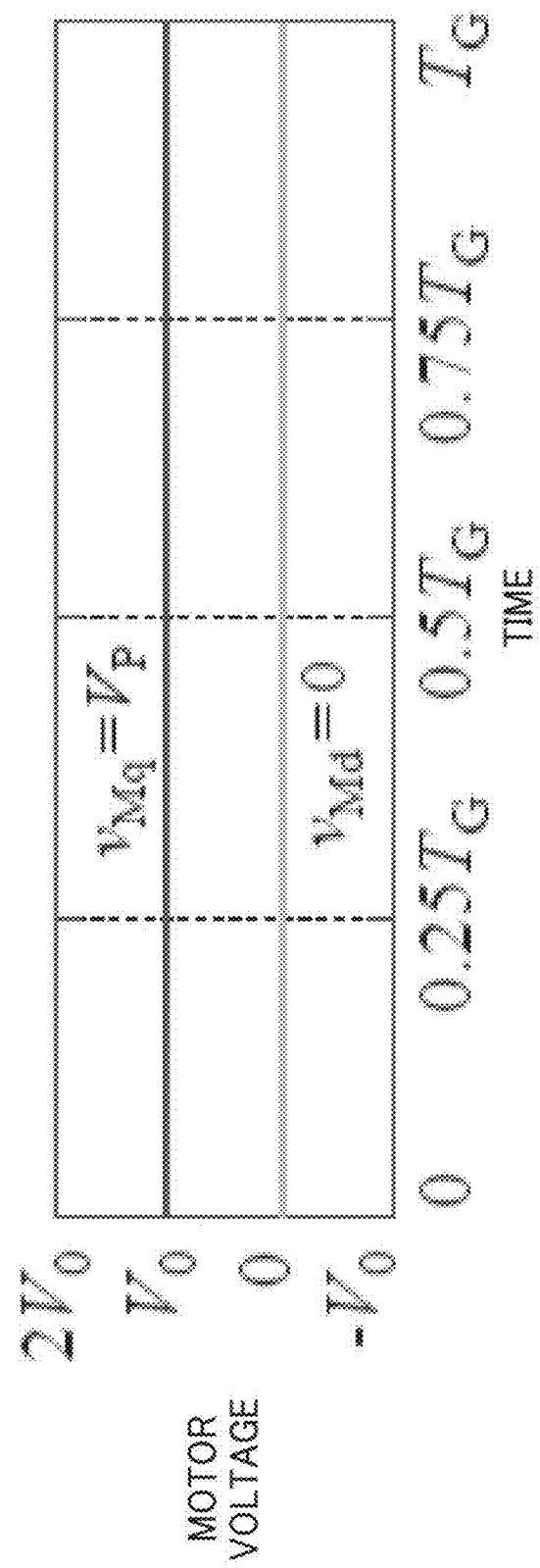
FIG. 6 shows the waveform of the motor voltage occurring when the conventional control is performed.
Figure 7:
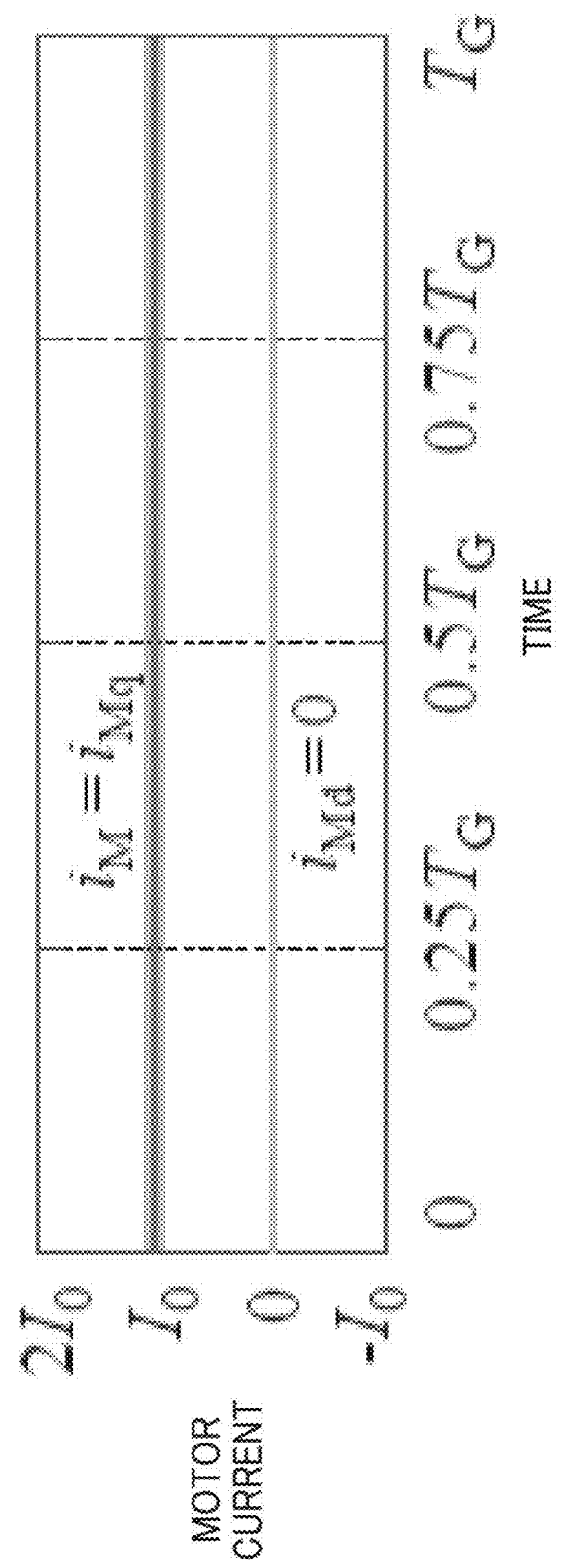
FIG. 7 shows the waveform of the motor current occurring when the conventional control is performed.
Figure 8:
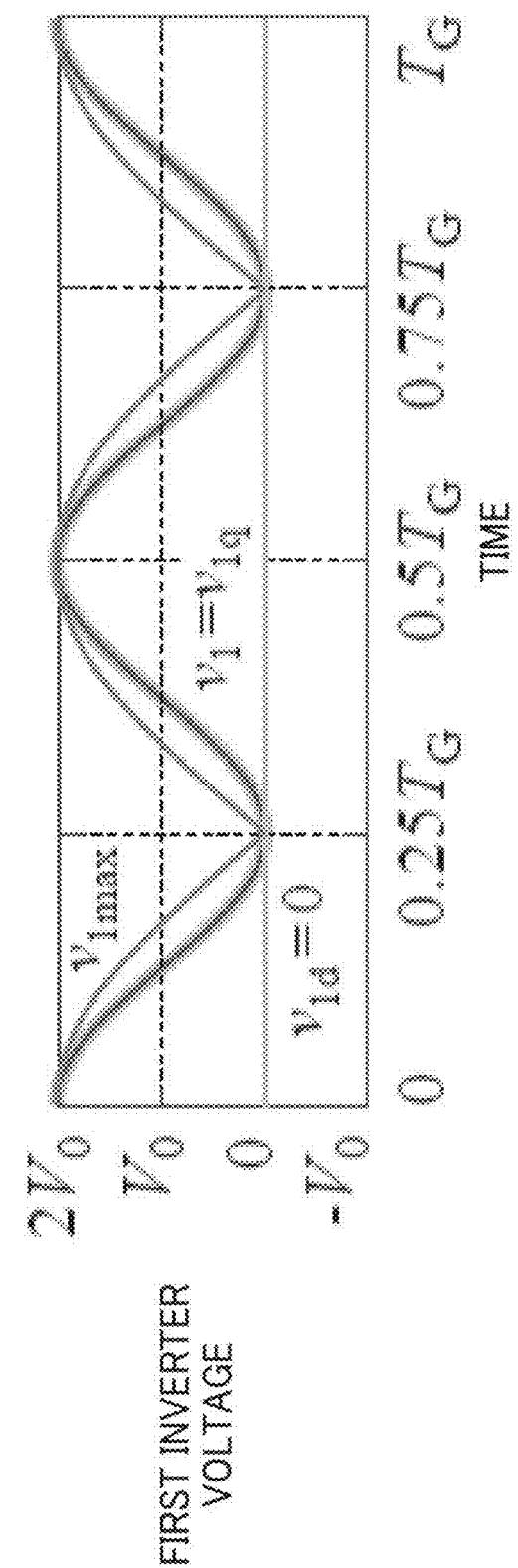
FIG. 8 shows the waveform of the first inverter output voltage occurring when the conventional control is performed.
Figure 9:
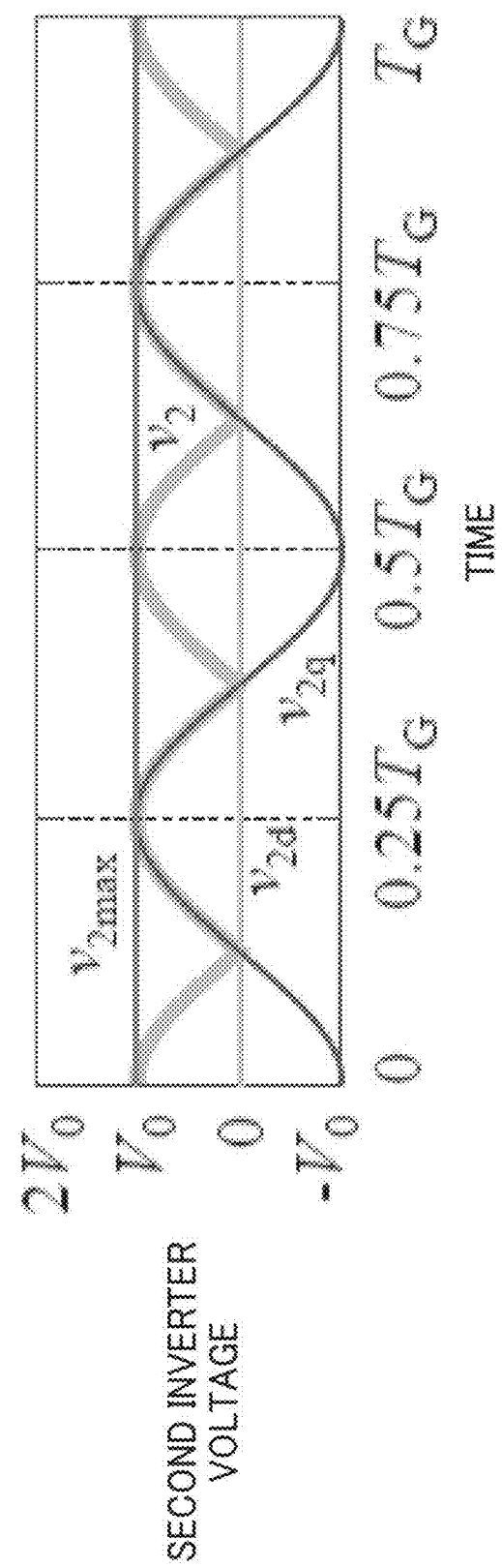
FIG. 9 shows the waveform of the second inverter output voltage occurring when the conventional control is performed.

FIG. 6 shows the waveform of the motor voltage of the motor drive device 100. FIG. 7 shows the waveform of the motor current of the motor drive device 100. FIG. 8 shows the waveform of the first inverter output voltage of the motor drive device 100. FIG. 9 shows the waveform of the second inverter output voltage of the motor drive device 100.

[Control Method According to the Embodiment]

A control method for the motor drive system 1 according to the embodiment will be described. In the conventional control method described above, the average power $p_{c2}\hat{}$ of the DC link capacitor of the second inverter is configured to be zero, whereas, in the control method according to the embodiment, the instantaneous power $p_{c2}(t)$ of the DC link capacitor of the second inverter is configured to be zero ($p_{c2}(t)=0$). Therefore, the second inverter applies the entire input power pulsation directly to the load of the three-phase motor ($p_M(t)=p_G(t)$). In this case, the motor rotation speed co and the motor voltage $v_P$ become constant due to the large inertia $J_{TOT}$ of the load. However, since $p_M(t)=p_G(t)$, the input power and the motor power pulsate, but the motor voltage $v_P$ is constant so that the q-axis component $i_{Mq}(t)$ of the motor current changes sinusoidally at a frequency twice the power supply frequency (expression (10)). Further, the motor current is proportional to the motor torque $t_M(t)$.

$$i_{Mq}(t) = \frac{2}{3} \frac{p_M(t)}{V_P} = \hat{I}_M \cdot \cos^2(2\pi f_G t) \quad (10)$$

In order to ensure $p_{c2}(T)=p_2(t)=0$ unlike the case of the conventional scheme, however, $$\hat{I}_M = 4/3 P_0/V_P \quad (11)$$

the space vector voltage $v_{-2}(t)$ of the second inverter should be zero or orthogonal to the motor current $i_M(t)$ to supply reactive power from the second inverter. That is, the second inverter is used only to control the space vector voltage $v_{-2}(t)$ in order to control the motor current. Therefore, the active power of the second inverter is zero. As shown in expression (12), the motor voltage vector $v_{-M}(t)$ is denoted by a synthesis of the first inverter output voltage vector $v_{-1}(t)$ and the first inverter output voltage vector $v_{-2}(t)$.

$$\underline{v}_M(t) = \underline{v}_1(t) + \underline{v}_2(t) \quad (12)$$

The motor drive system 1 is controlled as follows depending on the magnitude of the $V_P$.

When $v_{1max}(t) = |v_G(t)|/2 \geq V_P$:

In this case, since the input voltage is large, a sufficient power required for the motor can be supplied. Therefore, the d-axis current can be zero, and the motor current $i_M(t)$ can be equal to the q-axis component (expression (13)).

$$i_M(t) i_{Mq}(t) \quad (13)$$

The voltage vectors of the first inverter and the second inverter can be as shown in expressions (14) and (15), respectively.

$$\underline{v}_1(t) = jV_P \quad (14)$$

$$\underline{v}_2(t) = 0 \quad (15)$$

When $v_{1max} < V_P$:

In this case, since the input voltage is equal to or less than the motor voltage and so is not sufficient, it is necessary to apply a negative d-axis current $i_{Md}(t)$ to the motor. Therefore, the d-axis current $i_{Md}(t)$ is created in order for $v_{-2}(t)$ to be orthogonal to the motor current $i_{-M}(t)$. Meanwhile, $v_{-1}(t)$ can be in phase with $i_{-M}(t)$, and the magnitude of $v_{-1}(t)$ will be $v_{1max}$. That is, $v_1(t)=v_{1max}(t)$ or the maximum modulation rate $M_1=1$. Thereby, the root mean square (rms) current of both inverters and the motor can be minimized.

Figure 10:
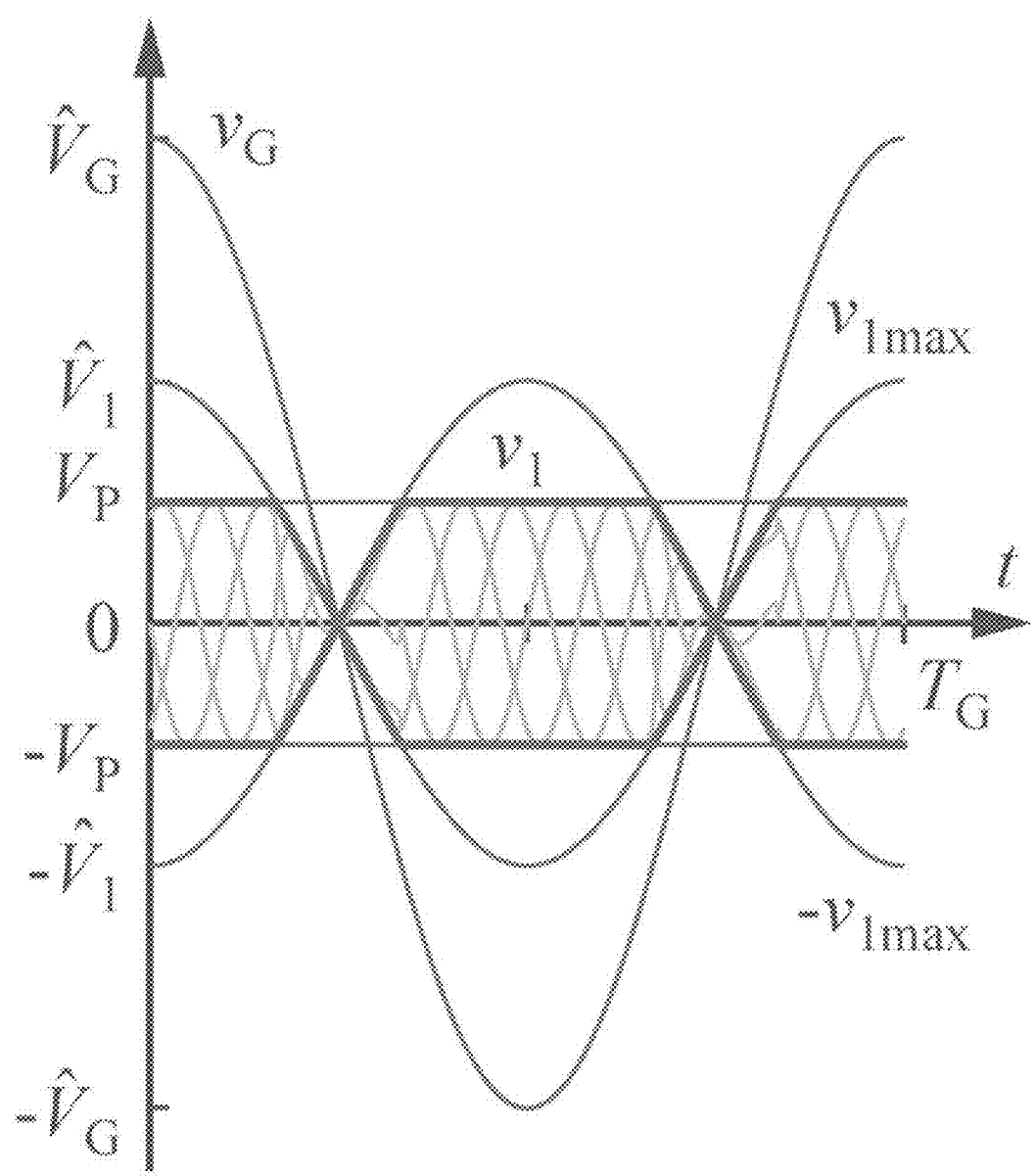
FIG. 10 shows the waveforms of the input voltage and the first inverter output voltage occurring when the control according to the embodiment is performed.
Figure 11:
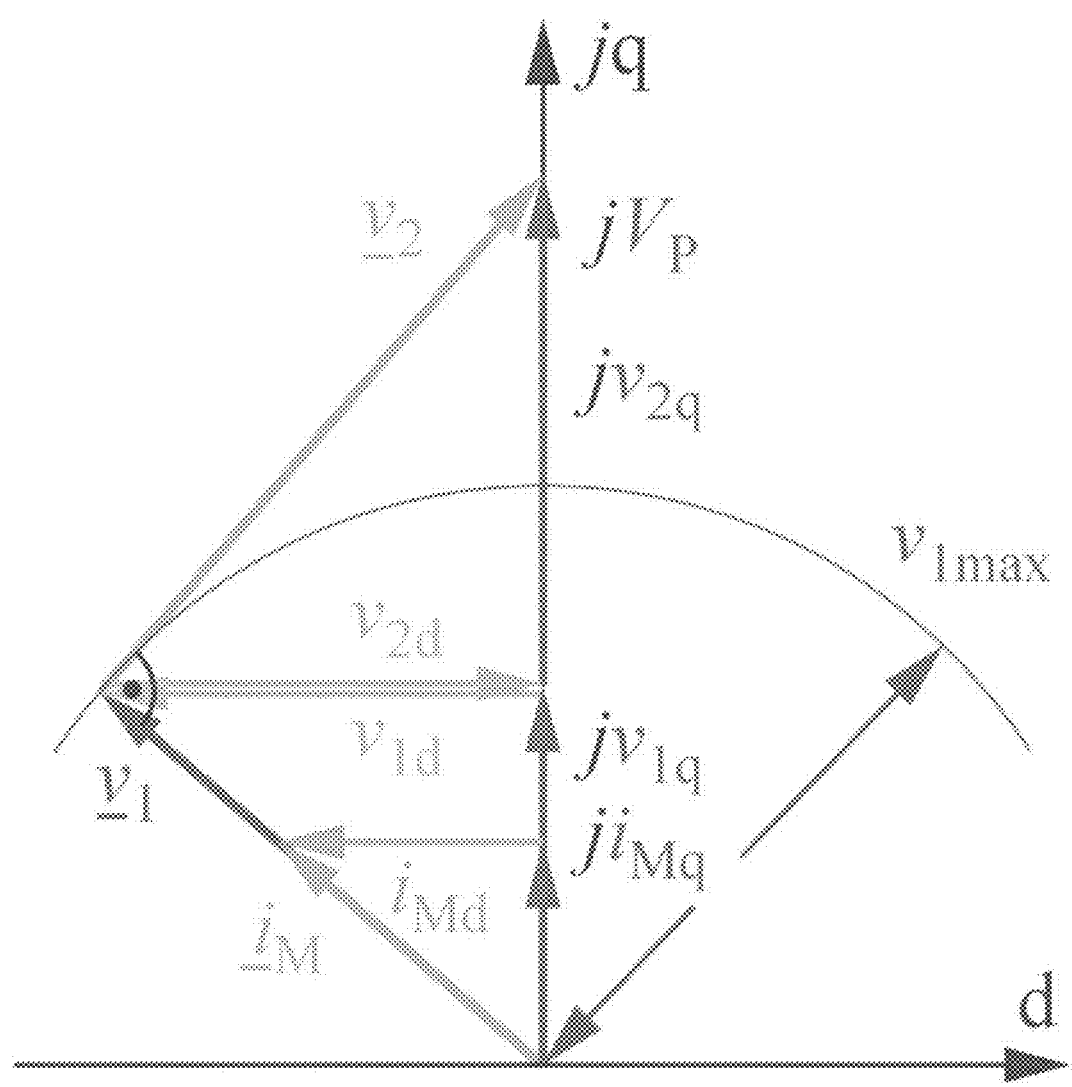
FIG. 11 shows space vectors corresponding to the first inverter output voltage and the second inverter output voltage occurring when the control according to the embodiment is performed.
Figure 12:
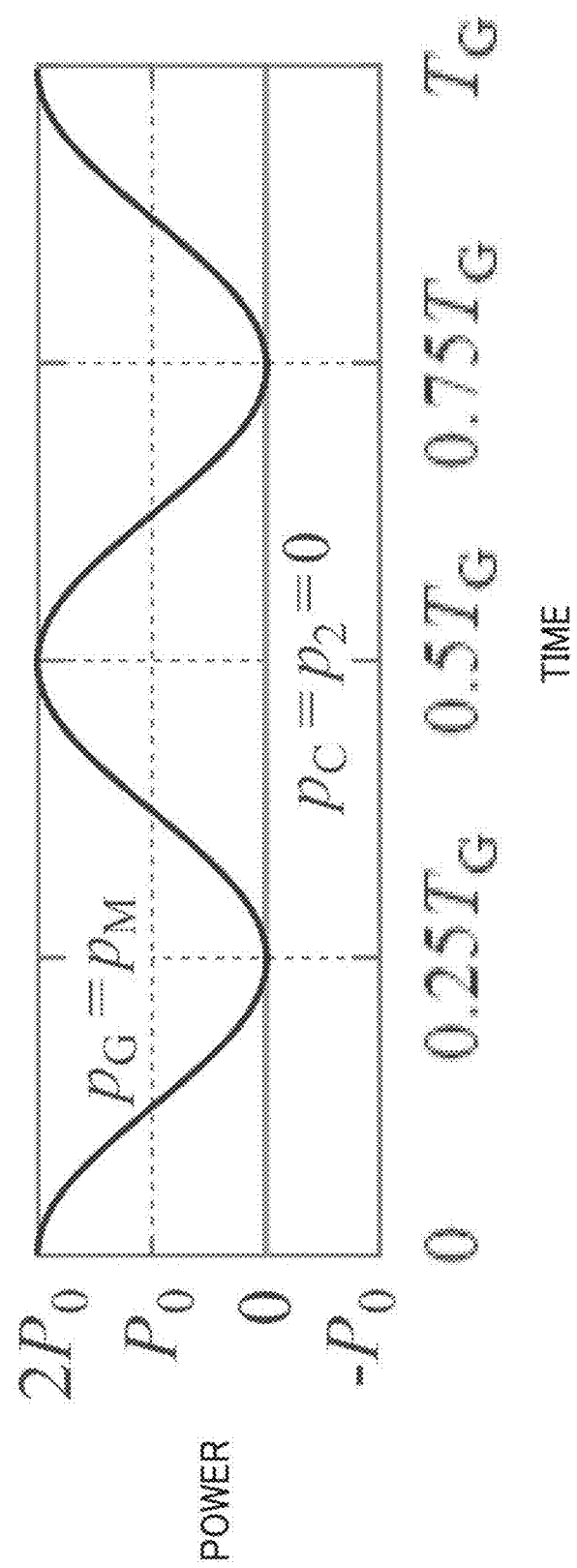
FIG. 12 shows the waveforms of the input power, the motor power, and the DC link capacitor power occurring when the control according to the embodiment is performed.
Figure 13:
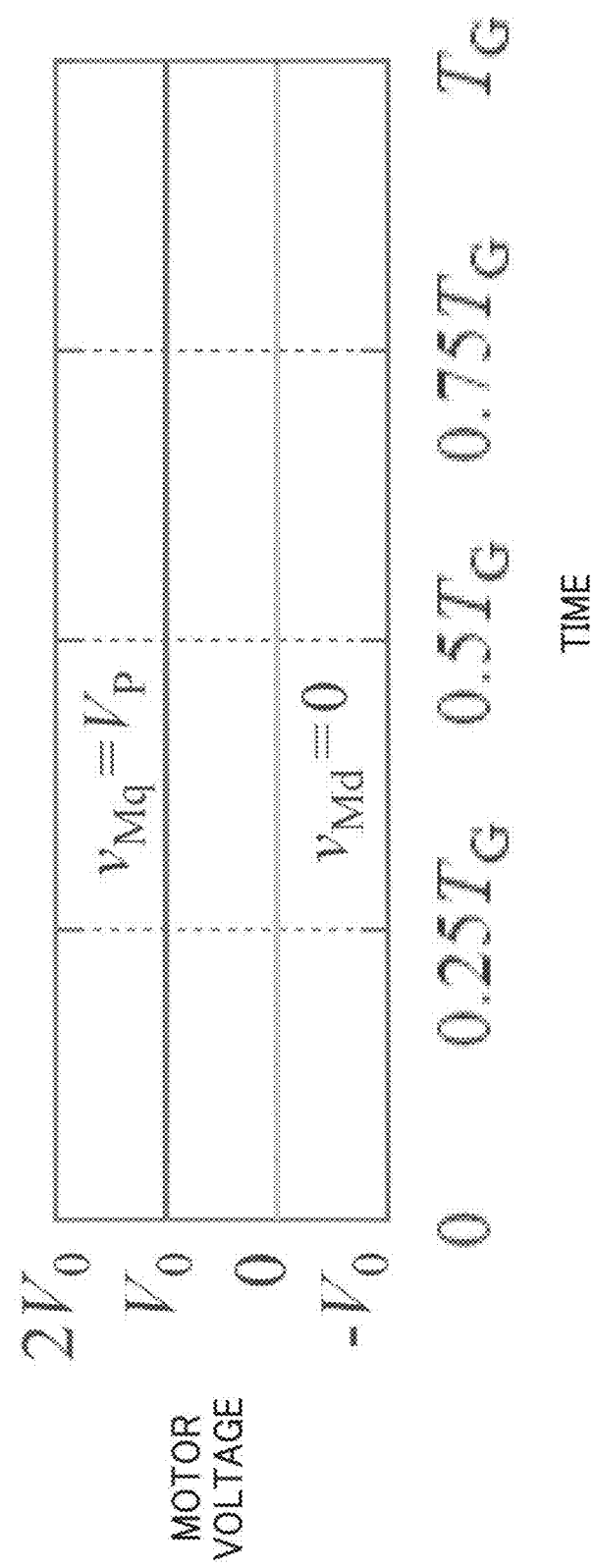
FIG. 13 shows the waveform of the motor voltage occurring when the control according to the embodiment is performed.
Figure 14:
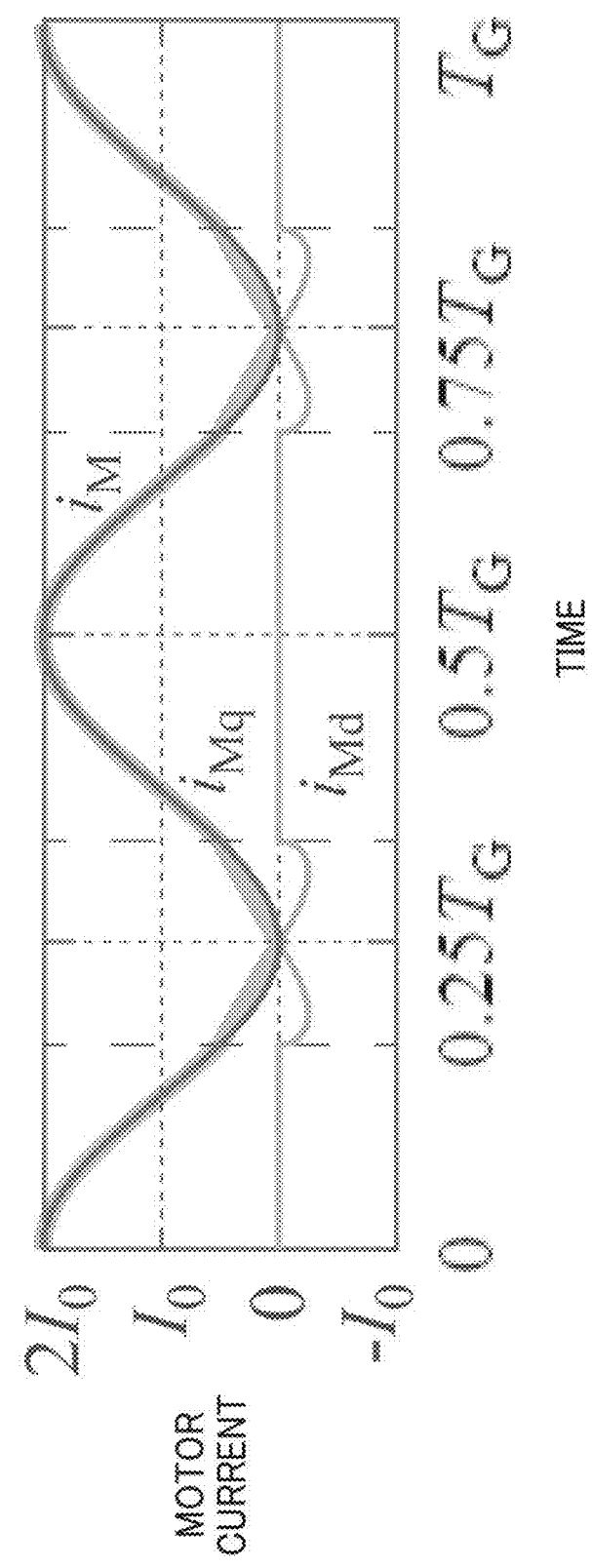
FIG. 14 shows the waveform of the motor current occurring when the control according to the embodiment is performed under the condition $V_P = v\hat{}_G/2$.
Figure 15:
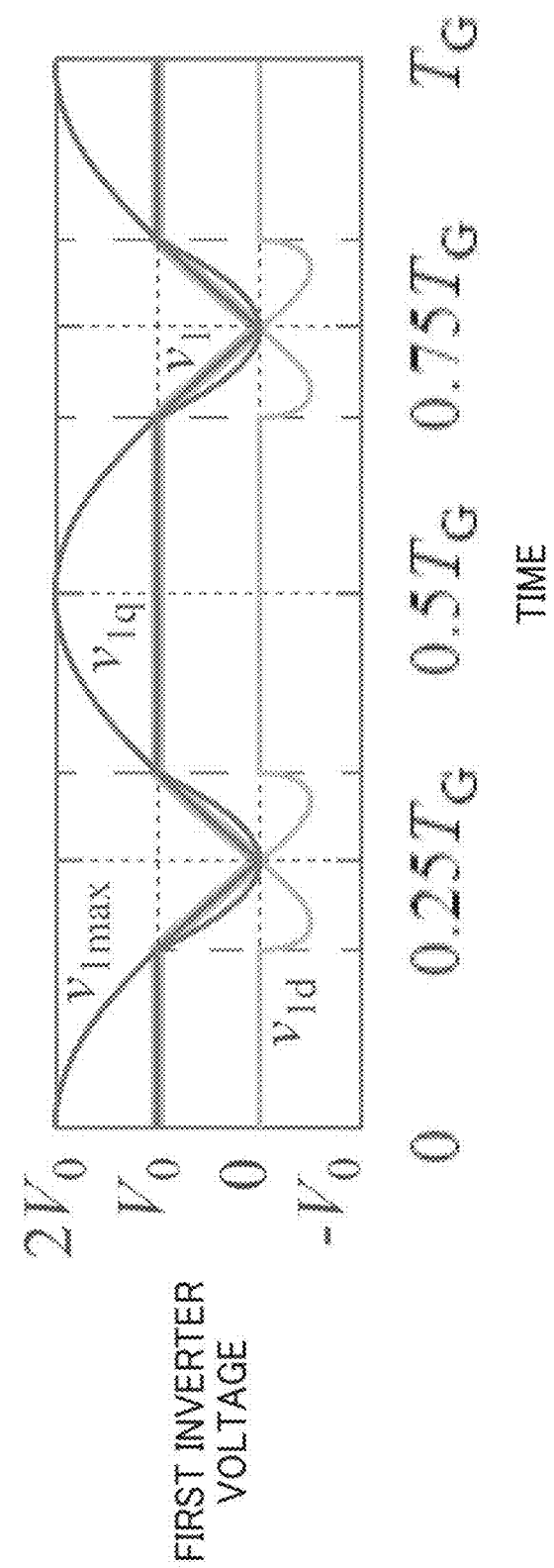
FIG. 15 shows the waveform of the first inverter output voltage occurring when the control according to the embodiment is performed under the condition $V_P = v\hat{}_G/2$.
Figure 16:
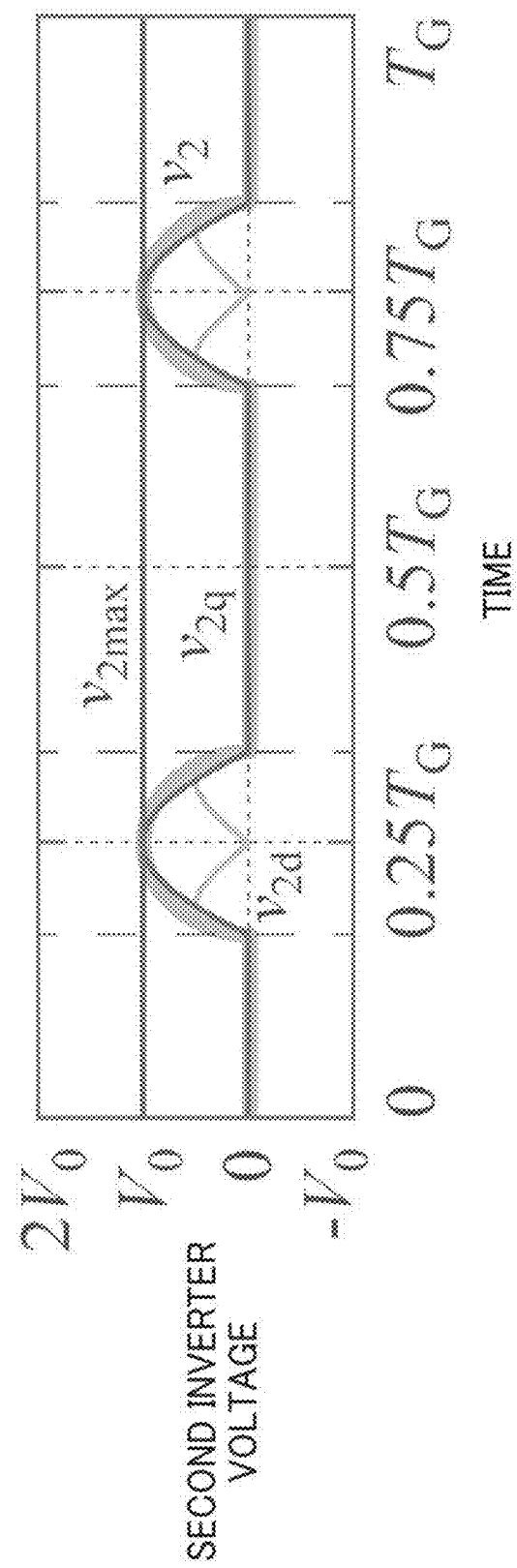
FIG. 16 shows the waveform of the second inverter output voltage occurring when the control according to the embodiment is performed under the condition $V_P = v\hat{}_G/2$.
Figure 17:
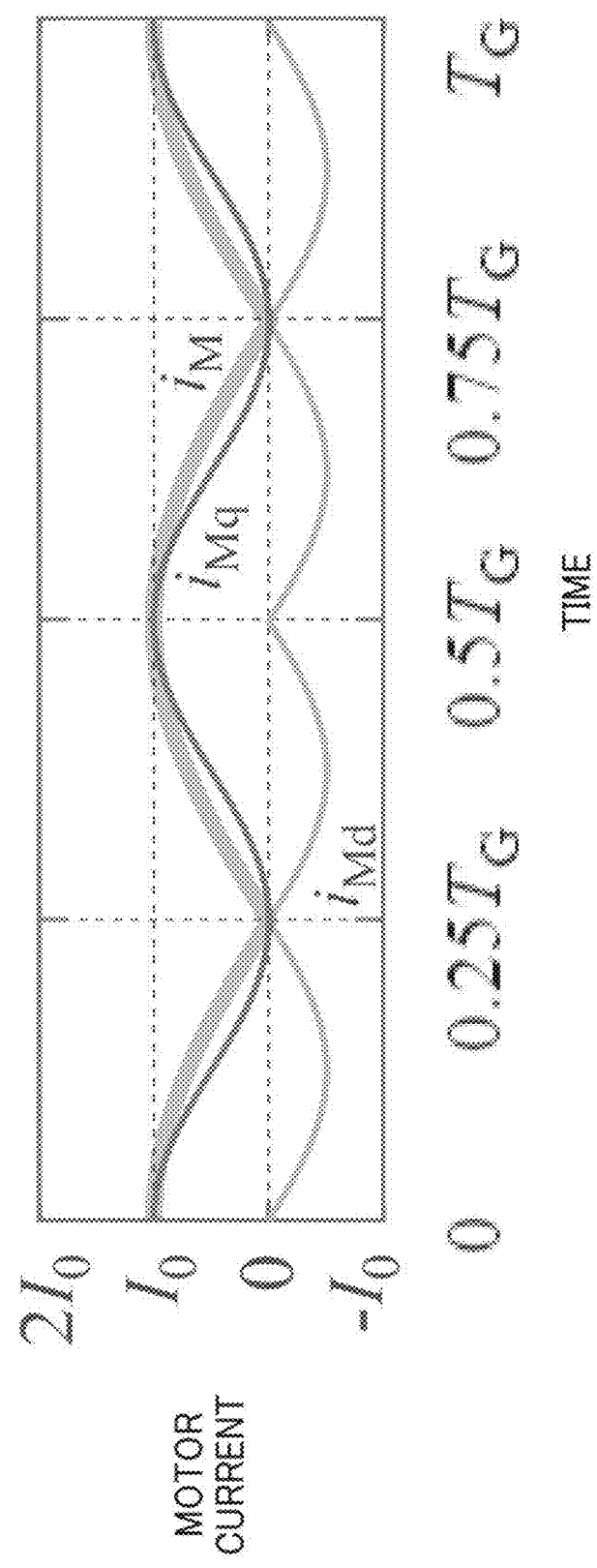
FIG. 17 shows the waveform of the motor current occurring when the control according to the embodiment is performed under the condition $V_P = v\hat{}_G/4$.
Figure 18:
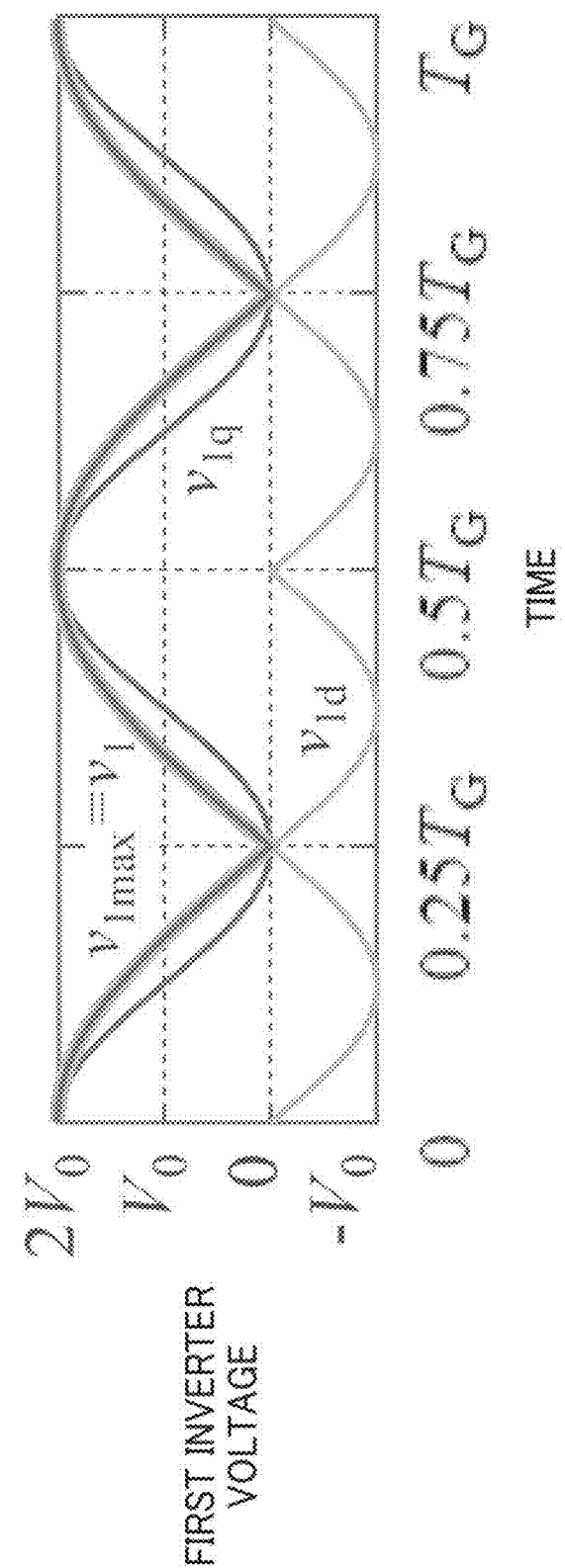
FIG. 18 shows the waveform of the first inverter output voltage occurring when the control according to the embodiment is performed under the condition $V_P = v\hat{}_G/4$.
Figure 19:
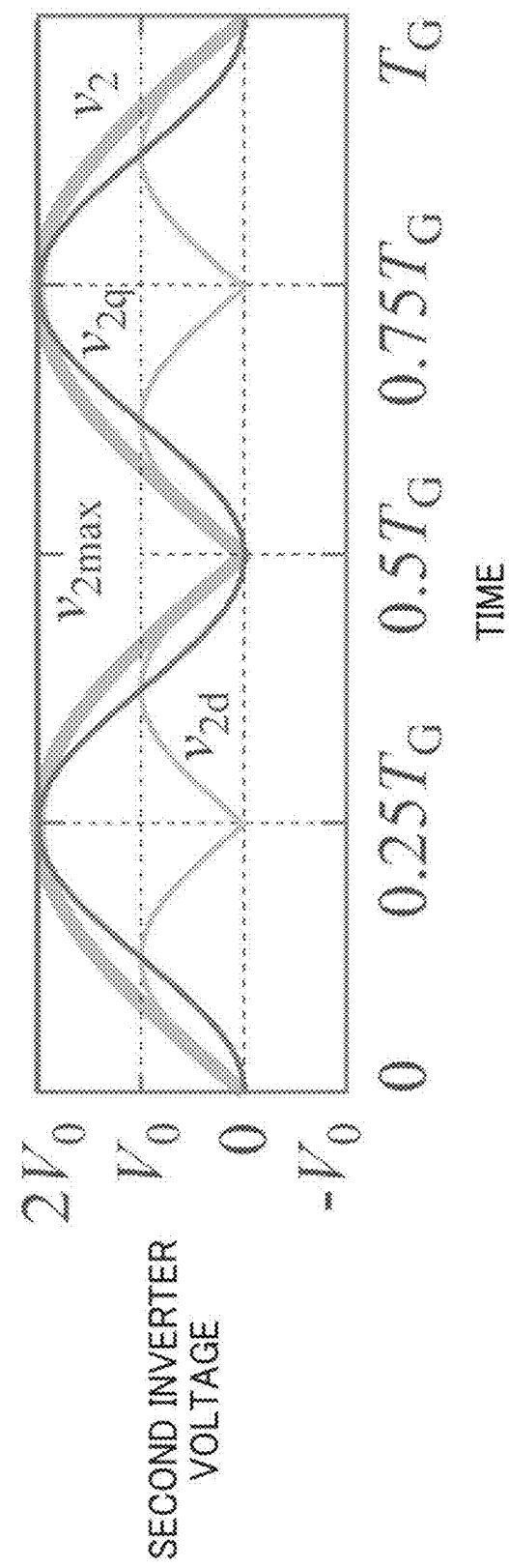
FIG. 19 shows the waveform of the second inverter output voltage occurring when the control according to the embodiment is performed under the condition $V_P = v\hat{}_G/4$.
Figure 20:
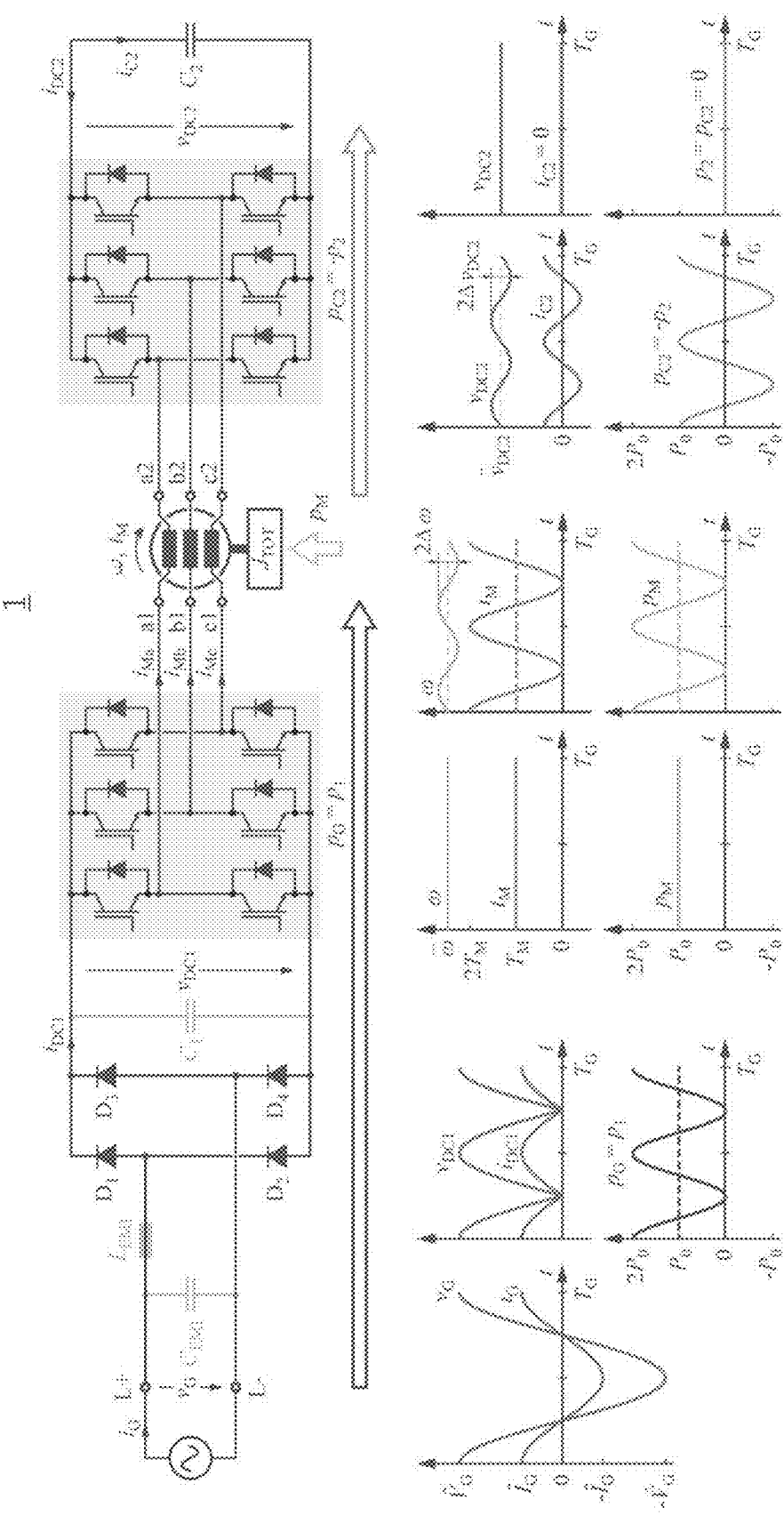
FIG. 20 shows the entirety of the motor drive device of FIG. 1 and the signal waveforms in the respective units collectively.

FIG. 10 shows the waveforms of the input voltage $v_G(t)$ and the first inverter output voltage $v_1(t)$ occurring when the control according to the embodiment is performed. FIG. 11 shows space vectors corresponding to the first inverter output voltage $v_1$ and the second inverter output voltage $v_2$ occurring when the control according to the embodiment is performed. FIG. 12 shows the waveforms of the input power $p_G(t)$, the motor power $T_M(t)$, and the DC link capacitor power $p_{c2}(t)$ occurring when the control according to the embodiment is performed. FIG. 13 shows the waveform of the motor voltage occurring when the control according to the embodiment is performed. FIG. 14 shows the waveform of the motor current occurring when $V_P=2V_0=v\hat{}_G/2$. FIG. 15 shows the waveform of the first inverter output voltage occurring when $V_P=2V_0=v\hat{}_G/2$. FIG. 16 shows the waveform of the second inverter output voltage occurring when $V_P=2V_0=v\hat{}_G/2$. FIG. 17 shows the waveform of the motor current occurring when $V_P=V_0=v\hat{}_G/4$. FIG. 18 shows the waveform of the first inverter output voltage occurring when $V_P=V_0=v\hat{}_G/4$. FIG. 19 shows the waveform of the second inverter output voltage occurring when $V_P=V_0=v\hat{}_G/4$. FIG. 20 shows the entirety of the motor drive device 100 according to the embodiment and the signal waveforms in the respective units collectively.

The power balance in the first inverter is given by expression (16).

$$p_1(t) = \frac{3}{2}\underline{v}_1(t) \cdot i_M(t) = \frac{3}{2} v_1(t) \cdot i_M(t) = p_G(t) \quad (16)$$

From this, $i_M(t)$ and $i_{Md}(t)$ are calculated as follows, respectively.

$$i_M(t) = \frac{2}{3} \frac{p_G(t)}{v_1(t)} \quad (17)$$

$$i_{Md}(t) = -\sqrt{i_M^2(t) - i_{Mq}^2(t)} \quad (18)$$

Furthermore, $v_{-1}(t)$ and $i_{-M}(t)$ are selected to be in phase, and $v_1(t)=v_{1max}(t)$. The d-axis voltage and q-axis voltage of the first inverter are proportional to the d-axis current and the q-axis current, respectively, as follows.

$$v_{1d}(t) = i_{Md}(t) \frac{v_1(t)}{i_M(t)} \quad (19)$$

$$v_{1q}(t) = i_{Mq}(t) \frac{v_1(t)}{i_M(t)} \quad (20)$$

Therefore, the d-axis voltage and q-axis voltage of the second inverter are calculated as follows from $v_{-M}(t)=v_{-1}(t)+v_{-2}(t)$.

$$v_{2d}(t) = -v_{1d}(t) \quad (21)$$

$$v_{2q}(t) = V_P - v_{1q}(t) \quad (22)$$

In further accordance with this embodiment, the motor induced voltage $V_P$ is not limited by the input power supply voltage $v_G(t)$. In the conventional scheme, active power is used to compensate for input power pulsation, and so it is necessary for $v_2$ to operate in such a way as to compensate for the operation of $v_1$. Therefore, $v_2$ for compensation is limited by $-V_P = -V_0 \leq v_2 \leq V_P = V_0$. Since this embodiment uses reactive power, however, there is no restriction as in the conventional scheme. Therefore, the DC link capacitor voltage $V_{DC2}$ of the second inverter can be arbitrarily selected as long as the withstand voltage of the element used is satisfied.

Figure 21:
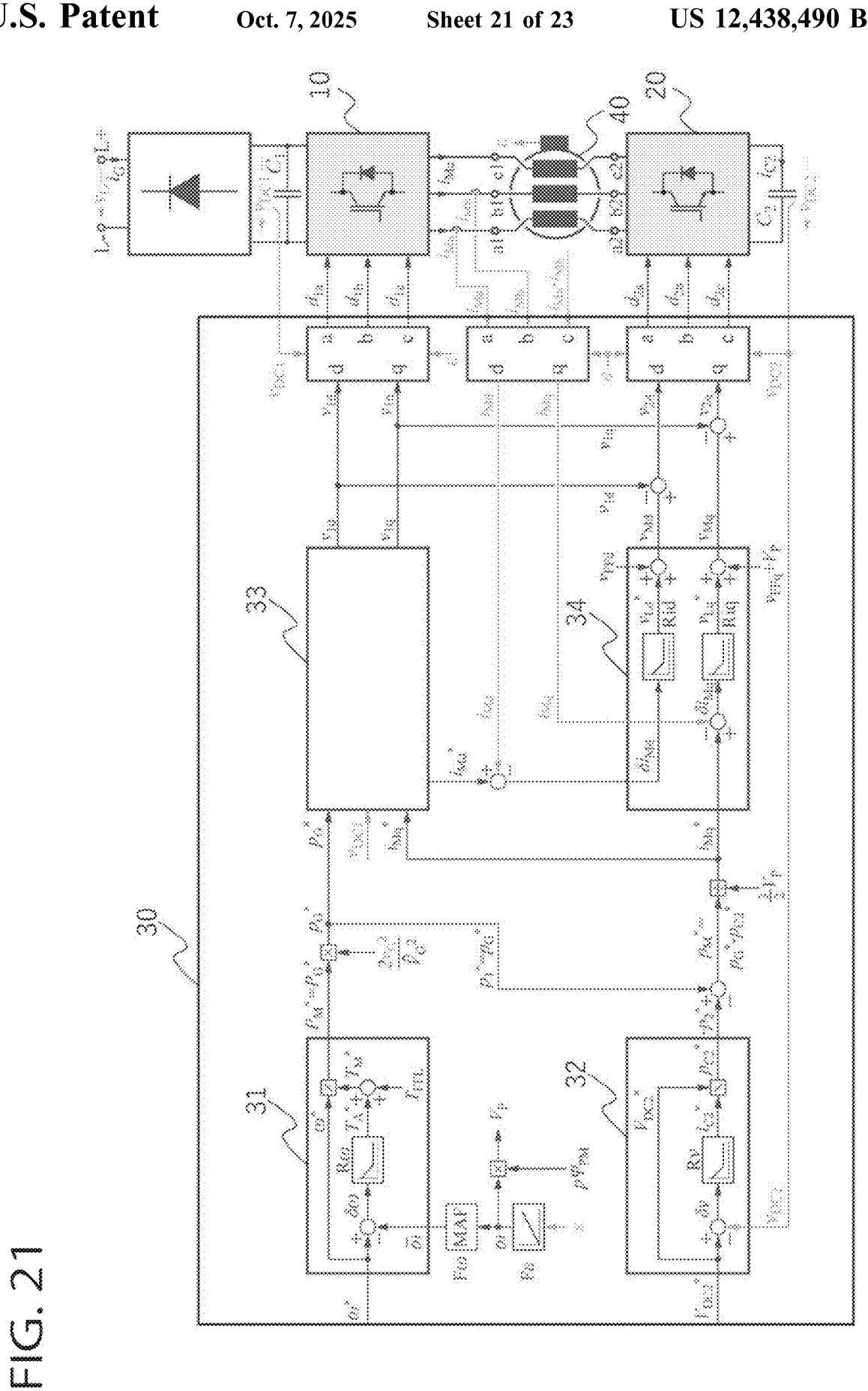
FIG. 21 is a block diagram showing the control unit of the motor drive system of FIG. 1.
Figure 22:
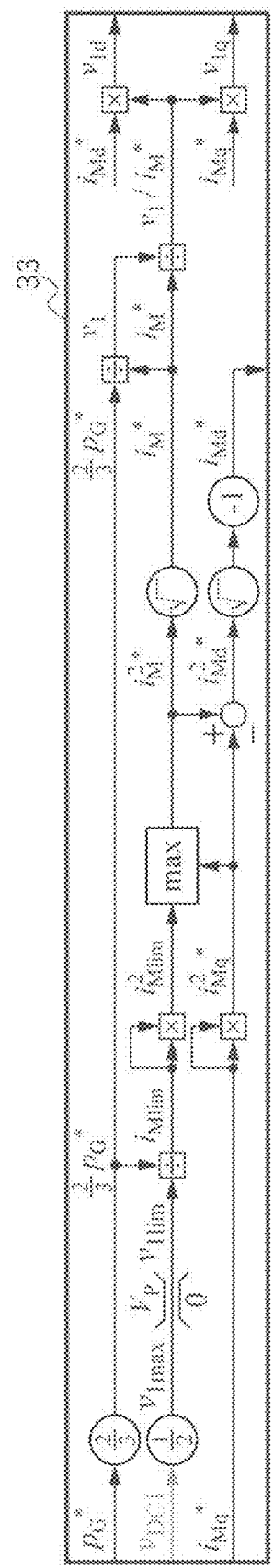
FIG. 22 is a detailed view of the voltage control unit of FIG. 21.

Next, the control by the control unit 30 of the motor drive system 1 according to the embodiment will be specifically described with reference to FIGS. 21 and 22. FIG. 21 is a block diagram showing the control unit 30 of the motor drive system 1 of FIG. 1. The control unit 30 includes a speed control unit 31, a DC link voltage control unit 32, a voltage control unit 33, and a current control unit 34. FIG. 22 is a detailed view of the voltage control unit 33.

[Speed Control Unit]

A target average speed $\omega^*$ of the three-phase motor 40 is input to the input terminal of the speed control unit 31. The target average speed $\omega^*$ is compared with a current average speed $\omega^-$ of the three-phase motor 40 calculated from the measured value ε of the angle of the three-phase motor 40. Further, the motor voltage $V_P$ is calculated by using the measured value P of the angle. The speed ω of the three-phase motor 40 pulsates at a frequency $2f_G$ twice the power supply frequency $f_G$. In order to obtain the average velocity $\omega^-$, therefore, a moving average filter (MAF) with a time constant of $T_G/2$ is applied. Thereafter, a target torque $T_A^*$ is determined from a speed error δω by a speed controller Ro. The target torque $T_M^*$ is calculated by adding a feedforward load torque $T_{FFL}$ to the target torque $T_A^*$. The target motor power $p_M^*$ is calculated by multiplying the target torque $T_M^*$ by the target average speed $\omega^*$. In this way, a target motor power $p_M^*$ that realizes the target average speed $\omega^*$ is output from the output terminal of the speed control unit 31. Assuming that there is no loss in the motor drive system 1, the target motor power $p_M^*$ is equal to the average input power $p_G^*$. Therefore, the instantaneous input power $p_G^*$ is given by expression (23).

$$p_G(t) = v_G(t) \cdot i_G(t) = P_0 \frac{2v_G^2}{\hat{V}_G^2} = P_0 + \tilde{p}_G(t) \tag{23}$$

[DC Link Voltage Control Unit]

The instantaneous motor power $p_M^*$ supplied to the three-phase motor 40 also depends on the instantaneous power $p_{c2}^*$ of the DC link capacitor supplied from the second inverter 20. The DC link voltage control unit 32 calculates the instantaneous power $p_{c2}^*$ of the DC link capacitor. A target average DC link capacitor voltage $V_{DC2}^*$ is input to the input terminal of the DC link voltage control unit 32. A DC link capacitor voltage controller Rv compares the target average DC link capacitor voltage $V_{DC2}^*$ with a DC link capacitor voltage measured value $V_{DC2}$. A speed error δv obtained thereby is converted into a target DC link capacitor current $i_{c2}^*$. The target DC link capacitor current $i_{c2}^*$ is multiplied by the target average DC link capacitor voltage $V_{DC2}^*$ to calculate a target DC link capacitor power $p_{c2}^*$. Thereby, the DC link capacitor voltage is returned to the target value. Thereafter, the q-axis component $i_{Mq}^*$ of the target motor current is calculated according to expression (24), using the instantaneous motor power $p_M^* = p_G^* - p_{c2}^*$.

$$i_{Mq}(t) = \frac{2}{3} \frac{p_M(t)}{V_P} = \hat{I}_M \cdot \cos^2(2\pi f_G t) \tag{24}$$

[Voltage Control Unit]

The instantaneous input power $p_G^*$, the rectified voltage $v_{DC1}$, and the q-axis component $i_{Mq}^*$ of the target motor current are input to the input terminal of the voltage control unit 33. The d-axis component $i_{Md}^*$ of the target motor current can be calculated from expressions (17) and (18). However, it should be noted that there is an upper limit to the feasible first inverter output voltage $v_1$. That is, the first inverter output voltage $v_1$ must be equal to or less than the maximum value $v_{1max}$ defined by expression (25).

$$v_{1max} = |v_G|/2 = v_{DC1}/2 \tag{25}$$

If the target motor current $i_M^*$ calculated by expression (17) is smaller than the q-axis component $i_{Mq}^*$, it is necessary to increase the value of $i_M^*$ so that the correct d-axis component $i_{Md}^*$ is obtained. For this reason, the voltage control unit 33 recalculates the value of the first inverter output voltage $v_1$ (so as to be small) according to expression (17), based on a given target input power $p_G^*$. The voltage control unit 33 then calculates the motor current $i_M(t)$ from expression (17) and calculates the d-axis component $i_{Md}(t)$ of the motor current from expression (18). Finally, the voltage control unit 33 calculates and outputs the d-axis component $v_{1d}(t)$ and the q-axis component $v_{1q}(t)$ of the first inverter output voltage $v_1$ from expression (19) and expression (20).

[Current Control Unit]

The current control unit 34 calculates a d-axis component $v_{Md}$ and a q-axis component $v_{Mq}$ of the motor voltage by using the d-axis component $i_{Md}^*$ and the q-axis component $i_{Mq}^*$ of the target motor current. Current controllers Rid and Riq in the current control unit 34 convert current errors $\delta i_{Md}$ and $\delta i_{Mq}$ into target induced voltages $v_{Ld}^*$ and $v_{Lq}^*$, respectively. Further, feedforward terms $v_{FFd} = -\omega p L_q i_{Mq}^*$ and $v_{FFq} + V_P = \omega p L_d i_{Md}^*$ are added to calculate $v_{Md}$ and $v_{Mq}$. Finally, by subtracting the d-axis voltage component $v_{1d}$ and the q-axis voltage component $v_{1q}$ of the first inverter, the d-axis voltage component $v_{2d}$ and the q-axis voltage component $v_{2q}$ of the second inverter are calculated and output.

As described above, the motor drive system according to the embodiment causes the q-axis current flowing in the motor to pulsate in synchronization with the single-phase AC power and causes the sufficiently large inertia of the motor to absorb the pulsation, thereby eliminating the need for an electrolytic capacitor in the dual inverter topology. Stated otherwise, the q-axis current is used for the motor torque and the d-axis current is used to control the motor magnetic flux in the related art, but, in this embodiment, the q-axis current is pulsated to pulsate the motor torque, and a configuration without an electrolytic capacitor is realized by absorbing the pulsation by the inertia.

Furthermore, the following significant advantages are provided by configuring the motor drive system of the embodiment to be of a dual inverter type.

Since a composite vector composed of the output voltage vector of the first inverter (master inverter) and the output voltage vector of the second inverter (slave inverter) becomes the motor voltage vector, a larger voltage can be applied to the motor than in a single inverter type motor drive system driven by one inverter.

Since the system operates at low frequencies, high-speed switching by means such as WBG semiconductors is not necessary.

Since the sum and the difference of the voltages output by the two inverters can be applied to the ends of the motor windings, a step-up chopper circuit is not required.

In certain embodiments, the control unit 30 controls the rectified voltage $v_{DC1}$ to be the q-axis component of the induced voltage of the three-phase motor 40 and controls the capacitor voltage $V_{DC2}$ of the DC link capacitor 60 to be zero, when the maximum value of the rectified voltage $v_{DC1}$ is equal to or greater than the induced voltage of the three-phase motor 40. When the maximum value of the rectified voltage $v_{DC1}$ is smaller than the induced voltage of the three-phase motor 40, the control unit 30 controls the first inverter 10 and the second inverter 20 so that the rectified voltage $v_{DC1}$ takes the maximum value.

According to this embodiment, the first inverter and the second inverter are precisely controlled according to the state of the rectified voltage (i.e., whether the maximum value of the rectified voltage is greater than the induced voltage of the motor) so that the effective current of the inverters and the motor can be minimized (i.e., the loss can be minimized).

In certain embodiments, the control unit 30 controls the first inverter 10 so as to output the pulsation of the power generated by the rectified voltage $v_{DC1}$ to one end of the open-end winding of the three-phase motor 40 and controls the second inverter 20 so that instantaneous power of the DC link capacitor 60 is zero.

According to this embodiment, not only the power pulsations supplied from the first inverter and the second inverter, but also the pulsation of the entire power generated by the rectification voltage can be compensated for by using the motor inertia.

In certain embodiments, the control unit 30 re-calculates the value of the first inverter output voltage $v_1$ based on a given target input power $p_G^*$, when the target motor current $i_M^*$ is smaller than the q-axis component $i_{Mq}^*$ of the target motor current $i_M^*$.

According to this embodiment, even if the target motor current $i_M^*$ is too small, the value of $i_M^*$ can be increased by recalculating the first inverter output voltage $v_1$ so that it does not exceed the upper limit value. Therefore, the power pulsations supplied from the first inverter and the second inverter can be stably compensated for.

Second Embodiment

Figure 23:
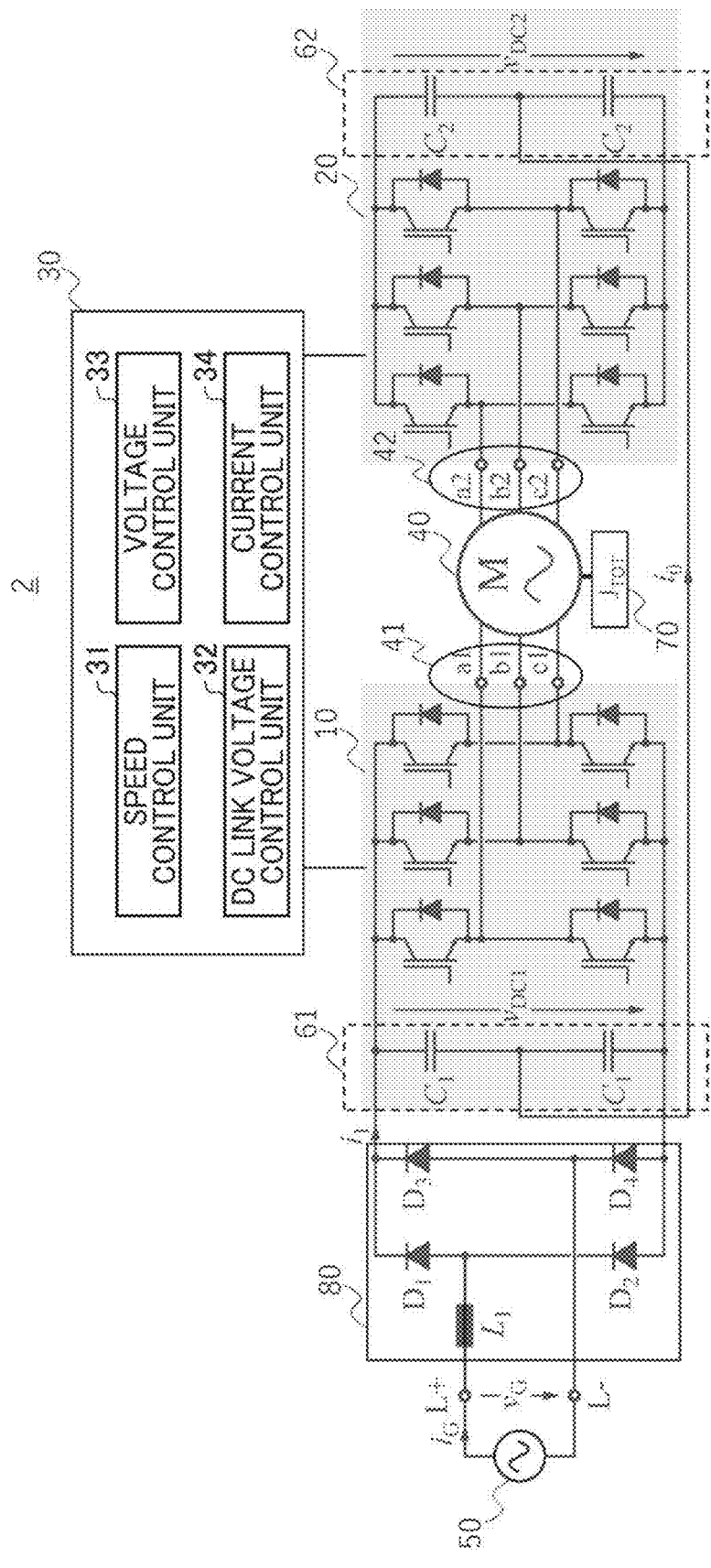
FIG. 23 is a block diagram illustrating the motor drive system according to the second embodiment.

FIG. 23 is a block diagram illustrating an example of a motor drive system 2 according to the second embodiment. Hereinafter, differences from the motor drive system 1 of FIG. 1 will be highlighted, and a duplication description is omitted. The motor drive system 2 includes a first inverter 10, a second inverter 20, and a control unit 30. The first inverter 10 is connected to one end 41 of the open-end winding included in a three-phase motor 40. The first inverter 10 includes a pair 61 of first DC link capacitors C1 connected in series. An input voltage from a single-phase AC power source 50 is rectified by a rectifier unit 80 and input to the first inverter 10. The second inverter 20 is connected to another end 42 of the open-end winding included the three-phase motor 40. The second inverter 20 includes a pair 62 of second DC link capacitors $C_2$ connected in series. The midpoint of the pair 61 of first DC link capacitors and the midpoint of the pair 62 of second DC link capacitors are connected to each other. The control unit 30 controls the first inverter 10 and the second inverter 20 so as to compensate for the active power of the second inverter 20 by power transfer via a common-mode current flowing between the midpoint of the pair 61 of the first DC link capacitor and the midpoint of the pair 62 of the second DC link capacitor.

According to this embodiment, pulsation compensation can be affected by simple control by using power transfer via a common-mode current.

An explanation based on the embodiments of the present invention has been given above. The embodiments are intended to be illustrative only and it will be understood by those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

What is claimed is:

1. A motor drive system comprising:
   a first inverter connected to one end of an open-end winding of a three-phase motor, an input voltage from a single-phase AC power source being rectified into a rectified voltage and input to the first inverter;
   a second inverter connected to another end of the open-end winding and including a DC link capacitor; and
   a control unit that controls the first inverter so that a first inverter output voltage supplied from the first inverter to the three-phase motor is in phase with a motor current flowing in the three-phase motor, controls the second inverter to supply reactive power to the three-phase motor by making a second inverter output voltage supplied from the second inverter to the three-phase motor orthogonal to the motor current in order to make an instantaneous power supplied from the DC link capacitor to the three-phase motor zero, and also controls the second inverter so that a q-axis component of the second inverter output voltage orthogonal to a d-axis component, which is a magnetic flux direction of the three-phase motor, pulsates in synchronization with the single-phase AC power source.

2. The motor drive system according to claim 1, wherein the control unit
   controls the rectified voltage to be a q-axis component of an induced voltage of the three-phase motor and controls a capacitor voltage of the DC link capacitor to be zero, when a maximum value of the rectified voltage is equal to or greater than the induced voltage of the three-phase motor, and
   controls the first inverter and the second inverter so that the rectified voltage takes the maximum value, when the maximum value of the rectified voltage is smaller than the induced voltage of the three-phase motor.

3. The motor drive system according to claim 1, wherein the control unit
   controls the first inverter so as to output a pulsation of a power generated by the rectified voltage to one end of the open-end winding of the three-phase motor and
   controls the second inverter so that an instantaneous power of the DC link capacitor is zero.

4. The motor drive system according to claim 1, wherein when a target motor current is smaller than a q-axis component of the target motor current, the control unit re-calculates a value of the first inverter output voltage based on a given target input power.

5. A motor drive system comprising:
a first inverter connected to one end of an open-end winding of a three-phase motor and including a pair of first DC link capacitors connected in series, an input voltage from a single-phase AC power source being rectified into a rectified voltage and input to the first inverter; and
a second inverter connected to another end of the open-end winding and including a pair of second DC link capacitors connected in series, wherein
a midpoint of the pair of first DC link capacitors and a midpoint of the pair of second DC link capacitors are connected to each other, and
the motor drive system further comprises:
a control unit that controls the first inverter and the second inverter so as to compensate for an active power of the second inverter by power transfer via a common-mode current flowing between the midpoints.

* * * * *